United States Patent
Lee et al.

(10) Patent No.: US 10,863,462 B2
(45) Date of Patent: Dec. 8, 2020

(54) METHOD FOR TRANSMITTING SYNCHRONISATION REFERENCE SIGNAL FOR DEVICE-TO-DEVICE (D2D) COMMUNICATION IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR); Jihyun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/248,362

(22) Filed: Jan. 15, 2019

(65) Prior Publication Data
US 2019/0150111 A1 May 16, 2019

Related U.S. Application Data

(63) Continuation of application No. 15/021,244, filed as application No. PCT/KR2014/009099 on Sep. 29, 2014, now Pat. No. 10,212,676.
(Continued)

(51) Int. Cl.
*H04W 56/00* (2009.01)
*H04L 5/00* (2006.01)
*H04W 72/04* (2009.01)

(52) U.S. Cl.
CPC ......... *H04W 56/001* (2013.01); *H04L 5/0048* (2013.01); *H04W 56/00* (2013.01); *H04W 72/04* (2013.01); *H04W 56/0015* (2013.01)

(58) Field of Classification Search
CPC ..... H04L 5/0048; H04L 5/005; H04L 5/0051; H04W 56/00; H04W 56/001;
(Continued)

(56) References Cited

U.S. PATENT DOCUMENTS 10,212,676 B2 2/2019 Lee et al.
2013/0185373 A1* 7/2013 Vandwalle ........ H04W 56/0015
709/208
(Continued)

FOREIGN PATENT DOCUMENTS

KR 10-2013-0029355 3/2013
KR 1020130035964 4/2013
(Continued)

OTHER PUBLICATIONS

United States Patent and Trademark Office U.S. Appl. No. 15/021,244, Office Action dated Feb. 9, 2018, 11 pages.
(Continued)

*Primary Examiner* — Khoa Huynh
(74) *Attorney, Agent, or Firm* — Lee Hong Degerman Kang Waimey

(57) ABSTRACT

The present invention relates to a method for receiving a synchronisation reference signal for device-to-device (D2D) communication by a first terminal in a wireless communication system and an apparatus therefor. More specifically, the present invention comprises a step of receiving a plurality of synchronisation reference signals including a first synchronisation reference signal and a second synchronisation reference signal over a D2D synchronisation reference signal transmission cycle, wherein the first synchronisation reference signal is transmitted by a cluster head for D2D communication and the second synchronisation reference signal is transmitted by a second terminal that belongs to a cluster for the D2D communication.

8 Claims, 27 Drawing Sheets

Related U.S. Application Data

(60) Provisional application No. 61/883,256, filed on Sep. 27, 2013, provisional application No. 61/896,642, filed on Oct. 28, 2013, provisional application No. 61/900,967, filed on Nov. 6, 2013, provisional application No. 61/929,495, filed on Jan. 20, 2014, provisional application No. 61/932,758, filed on Jan. 28, 2014, provisional application No. 61/936,891, filed on Feb. 7, 2014, provisional application No. 61/977,646, filed on Apr. 10, 2014, provisional application No. 62/032,629, filed on Aug. 3, 2014.

(58) Field of Classification Search
CPC ........... H04W 56/0015; H04W 56/002; H04W 56/0025; H04W 72/04
See application file for complete search history.

(56) References Cited

U.S. PATENT DOCUMENTS

| | | | |
|---|---|---|---|
| 2015/0009949 A1 | 1/2015 | Khoryaev et al. | |
| 2016/0143077 A1* | 5/2016 | Fodor | H04W 76/14 370/329 |
| 2016/0191113 A1* | 6/2016 | Zhu | H04B 1/7073 370/342 |
| 2016/0198289 A1 | 7/2016 | Sorrentino | |
| 2016/0227495 A1 | 8/2016 | Lee et al. | |

FOREIGN PATENT DOCUMENTS

| | | |
|---|---|---|
| KR | 1020130046298 | 5/2013 |
| WO | 2013066126 | 5/2013 |
| WO | 2013075340 | 5/2013 |
| WO | 2013100831 | 7/2013 |

OTHER PUBLICATIONS

United States Patent and Trademark Office U.S. Appl. No. 15/021,244, Office Action dated Jul. 3, 2017, 12 pages.

PCT International Application No. PCT/KR2014/009099, Written Opinion of the International Searching Authority dated Jan. 19, 2015, 15 pages.

\* cited by examiner

FIG. 2
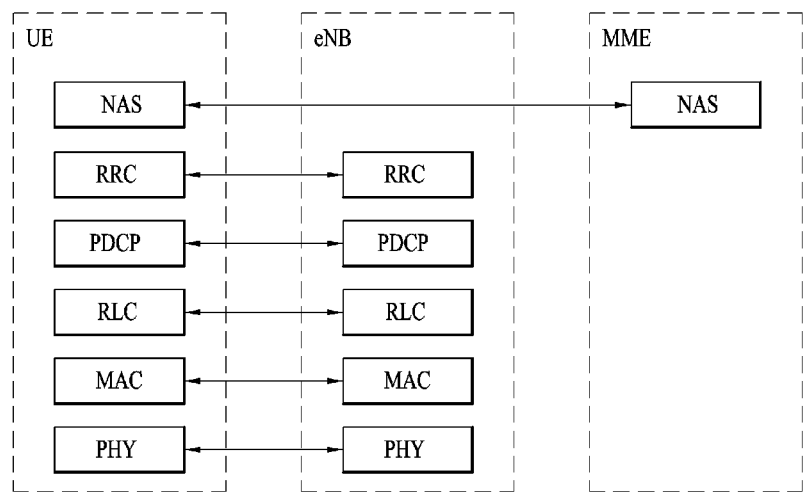
(a) Control-plane protocol stack
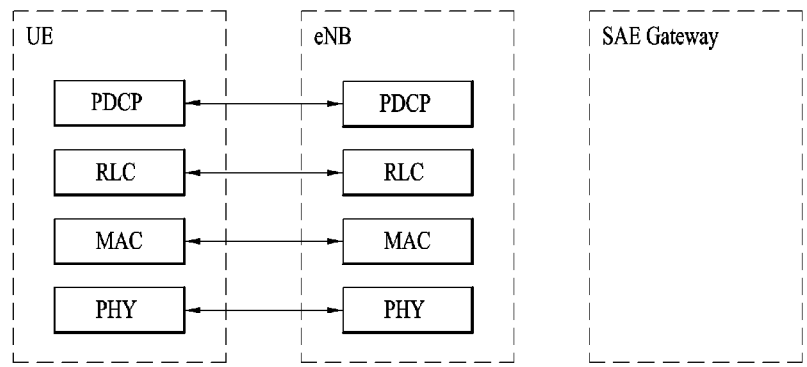
(b) User-plane protocol stack FIG.35
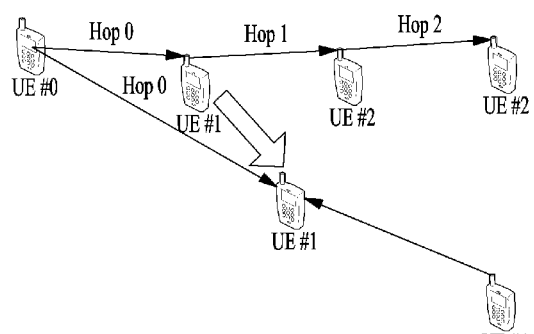
(a)
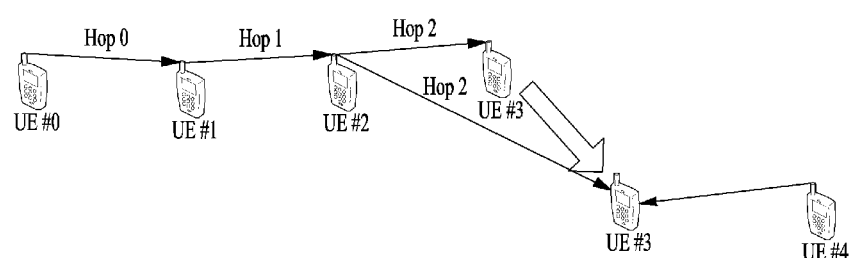
(b)

METHOD FOR TRANSMITTING SYNCHRONISATION REFERENCE SIGNAL FOR DEVICE-TO-DEVICE (D2D) COMMUNICATION IN WIRELESS COMMUNICATION SYSTEM AND APPARATUS THEREFOR

CROSS-REFERENCE TO RELATED APPLICATIONS

This application is a continuation of U.S. patent application Ser. No. 15/021,244, filed on Mar. 10, 2016, now U.S. Pat. No. 10,212,676, which is the National Stage filing under 35 U.S.C. 371 of International Application No. PCT/KR2014/009099, filed on Sep. 29, 2014, which claims the benefit of U.S. Provisional Application No. 61/883,256, filed on Sep. 27, 2013, 61/896,642, filed on Oct. 28, 2013, 61/900,967, filed on Nov. 6, 2013, 61/929,495, filed on Jan. 20, 2014, 61/932,758, filed on Jan. 28, 2014, 61/936,891, filed on Feb. 7, 2014, 61/977,646, filed on Apr. 10, 2014 and 62/032,629, filed on Aug. 3, 2014, the contents of which are all hereby incorporated by reference herein in their entirety.

TECHNICAL FIELD

The present invention relates to a wireless communication system and, more particularly, to a method for transmitting a synchronization reference signal for device-to-device (D2D) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE

Technical Problem

The present invention based on the above-described discussion provides a method for transmitting a synchronization reference signal for D2D communication in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention for solving the above-described problem, provided herein is a method for receiving a synchronization reference signal for device-to-device (D2D) communication by a first user equipment (UE) in a wireless communication system, including receiving a plurality of synchronization reference signals including a first synchronization reference signal and a second of synchronization reference signal in a D2D synchronization reference signal transmission period, wherein the first synchronization reference signal is transmitted by a cluster head for D2D communication and the second synchronization reference signal is transmitted by a second UE belonging to a cluster for D2D communication.

A transmission period of the second synchronization reference signal may be configured to be different from a transmission period of the first synchronization reference signal.

A transmission resource index of the second synchronization reference signal may be configured to be different from a transmission resource index of the first synchronization reference signal.

The first synchronization reference signal may be repeatedly transmitted to be equalized with a boundary of a subframe when a random backoff end time of the cluster head is not equal to the boundary of the subframe.

Resource allocation information for the first synchronization reference signal and the second synchronization reference signal may be transmitted over a physical device-to-device synchronization channel (PD2DSCH).

In another aspect of the present invention for solving the above-described problem, provided herein is a first user equipment (UE) for receiving a synchronization reference signal for device-to-device (D2D) communication in a wireless communication system, including a radio frequency unit; and a processor and wherein the processor is configured to receive a plurality of synchronization reference signals including a first synchronization reference signal and a second of synchronization reference signal in a D2D synchronization reference signal transmission period, and wherein the first synchronization reference signal is transmitted by a cluster head for D2D communication and the second synchronization reference signal is transmitted by a second UE belonging to a cluster for D2D communication.

Advantageous Effects

According to embodiments of the present invention, a synchronization reference signal for D2D communication can be efficiently transmitted in a wireless communication system.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 2 is a diagram illustrating structures of a control plane and a user plane of a radio interface protocol between a user equipment and E-UTRAN based on the 3GPP radio access network standard.

FIG. 35 is a diagram referred to for describing reselection of a D2DSS in consideration of a hop count.

BEST MODE

Figure 1:
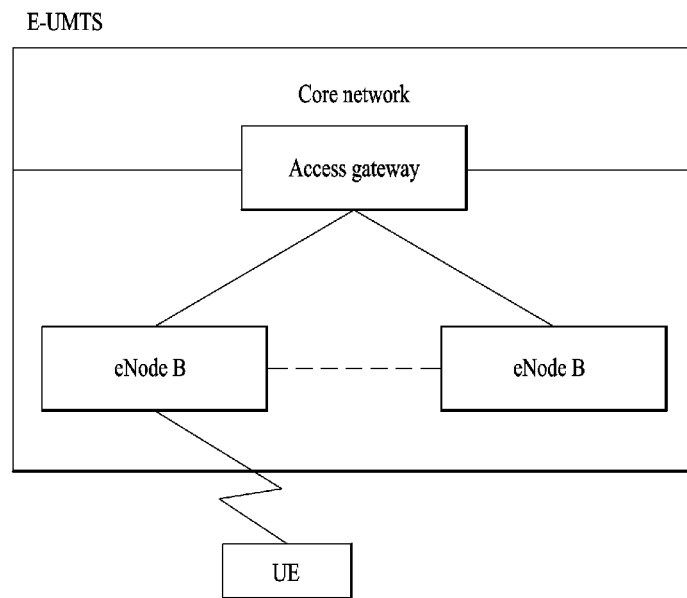
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
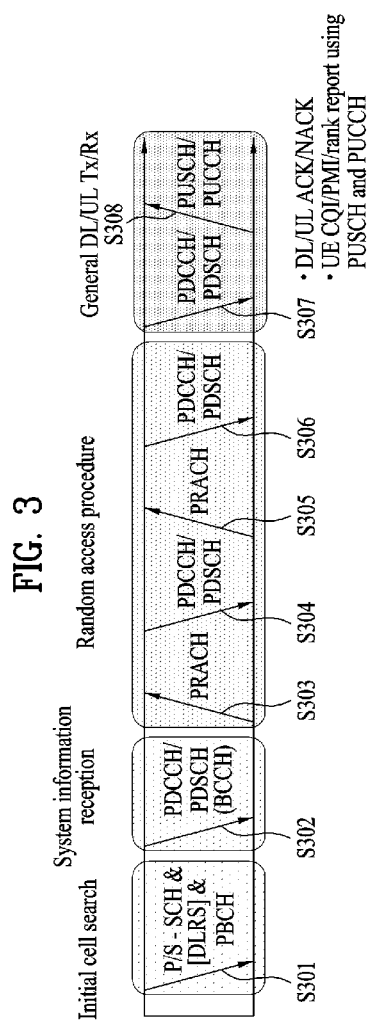
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
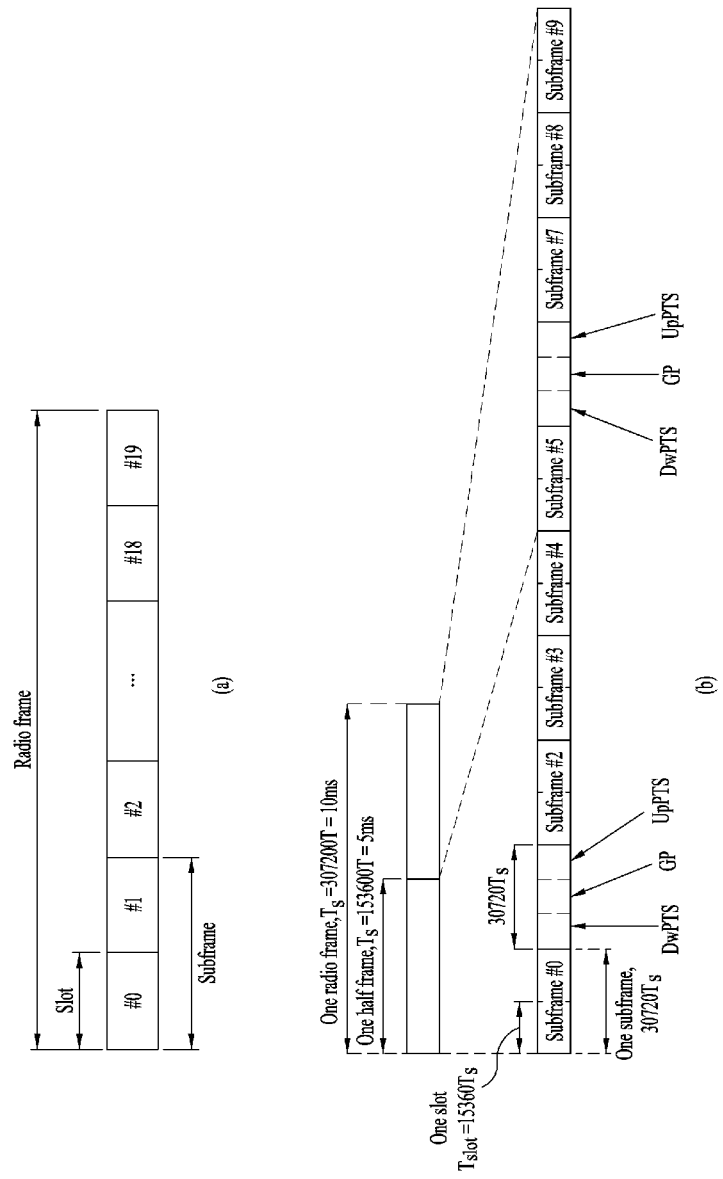
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4($a$) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4($b$) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |

TABLE 1-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 8 | $24144 \cdot T_s$ | — | — | — | — | — |
| 9 | $13168 \cdot T_s$ | — | — | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
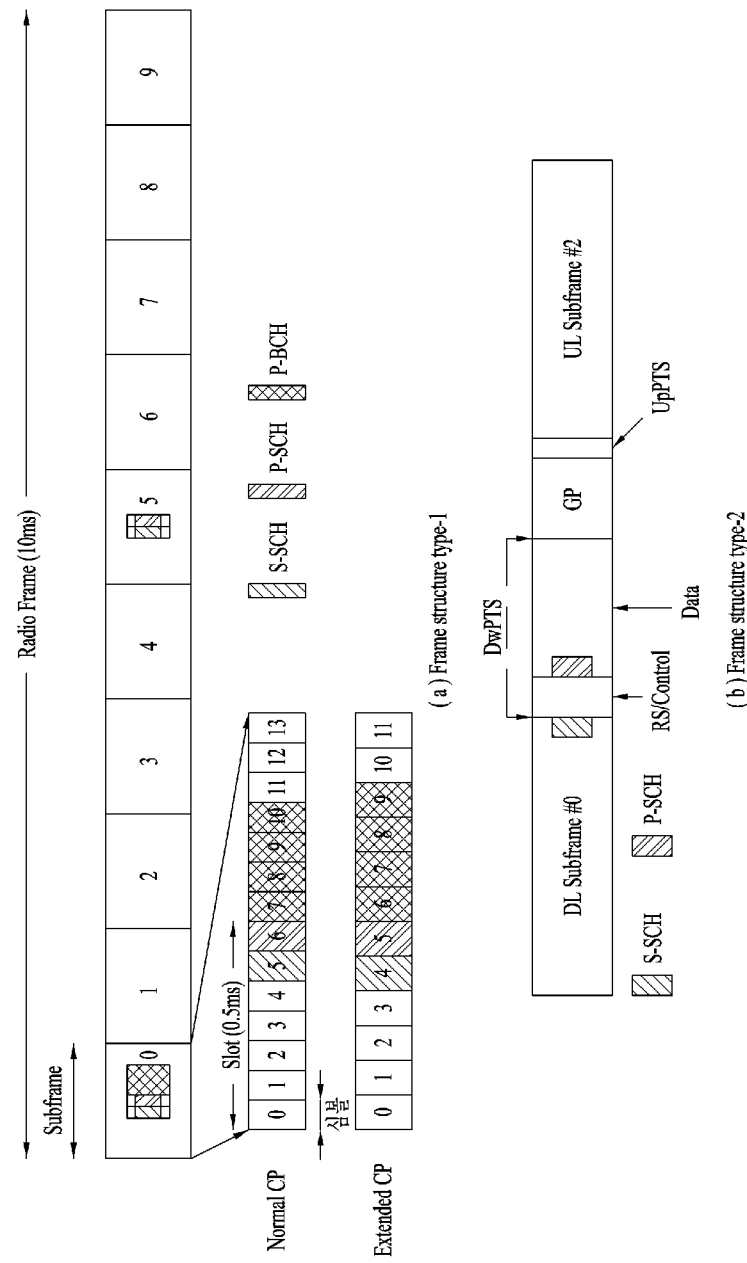
FIG. 5 illustrates a primary broadcast channel (P-BCH) and a synchronization channel (SCH) of an LTE system.

FIG. 5 illustrates a primary broadcast channel (P-BCH) and a synchronization channel (SCH) of an LTE system. The SCH includes a P-SCH and an S-SCH. A primary synchronization signal (PSS) is transmitted over the P-SCH and a secondary synchronization signal (SSS) is transmitted over an S-SCH.

Referring to FIG. 5, in frame structure type-1 (i.e., FDD), the P-SCH is located in each of slot #0 (i.e., the first slot of subframe #0) and slot #10 (i.e., the first slot of subframe #5) in every radio frame. The S-SCH is located on an OFDM symbol immediately prior to the last OFDM symbol of each of slot #0 and slot #10 in every radio frame. The S-SCH and the P-SCH are located on adjacent OFDM symbols. In frame structure type-2 (i.e., TDD), the P-SCH is transmitted on the third OFDM symbol of each of subframes #1 and #6 and the S-SCH is located on the last OFDM symbol of each of slot #1 (i.e., the second slot of subframe #0) and slot #11 (i.e., the second slot of subframe #5). The P-BCH is transmitted in every four radio frame regardless of a frame structure type and is transmitted using the first to fourth OFDM symbols of the second slot of subframe #0.

The P-SCH is transmitted using 72 subcarriers (10 subcarriers being reserved and 62 subcarriers carrying PSS) based on a direct current (DC) subcarrier on a corresponding OFDM symbol. The S-SCH is transmitted using 72 subcarriers (10 subcarriers being reserved and 62 subcarriers carrying an SSS) based on a DC subcarrier on a corresponding OFDM symbol. The P-BCH is mapped to four OFDM symbols and 72 subcarriers based on a DC subcarrier, in one subframe.

Figure 6:
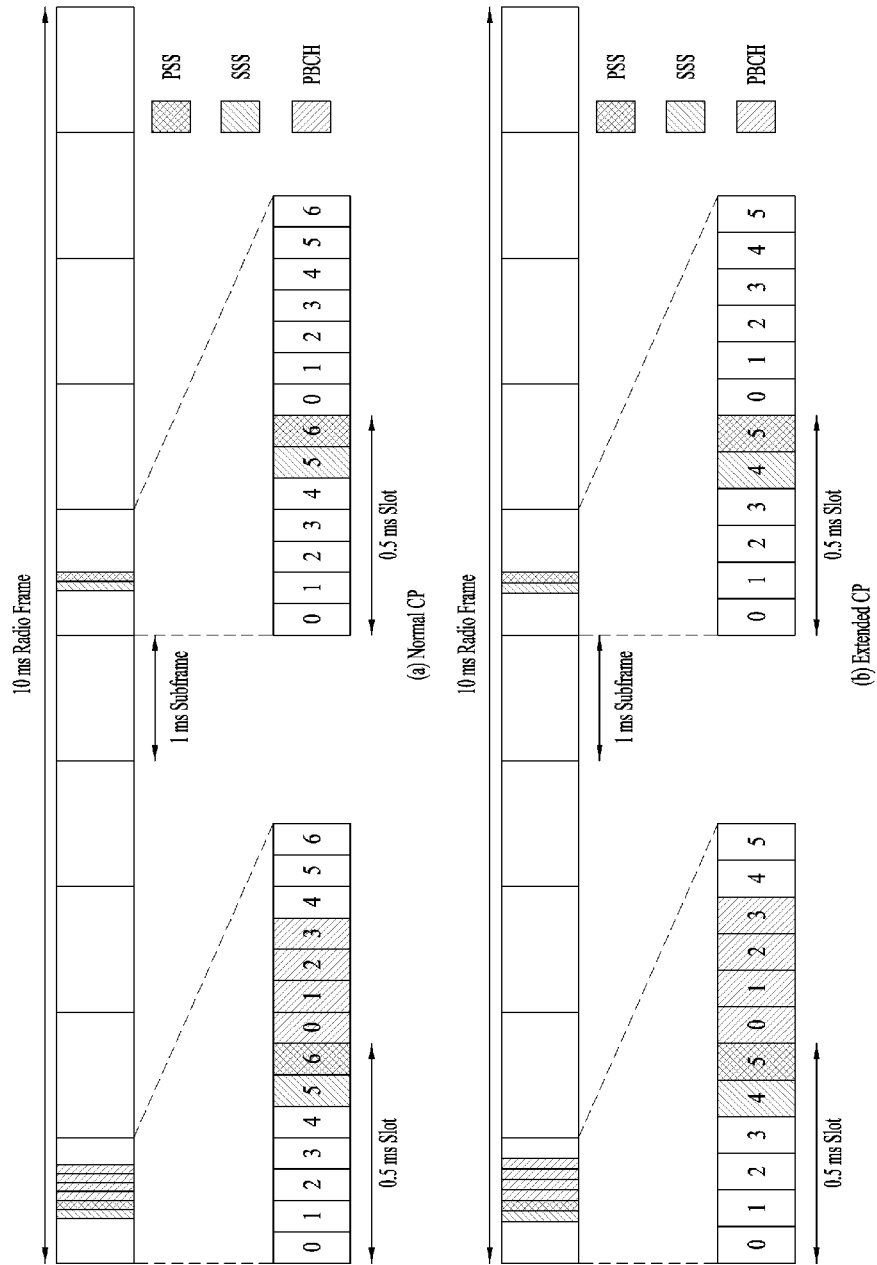
FIG. 6 illustrates a radio frame structure for transmission of a synchronization signal (SS).

FIG. 6 illustrates a radio frame structure for transmission of a synchronization signal (SS). Specifically, FIG. 6 illustrates a radio frame structure for transmission of an SS and a PBCH in frequency division duplex (FDD), wherein FIG. 6(a) illustrates transmission locations of an SS and a PBCH in a radio frame configured as a normal cyclic prefix (CP) and FIG. 6(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 6. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 6, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ ($=3N^{(1)}_{ID}+N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \quad \text{[Equation]}$$

where $N_{ZC}$=63 and a sequence element corresponding to a DC subcarrier, n=31, is punctured.

The PSS is mapped to 6 RBs (=72 subcarriers) near a center frequency. Among the 72 subcarriers, 9 remaining subcarriers always carry a value of 0 and serve as elements facilitating filter design for performing synchronization. To define a total of three PSSs, u=24, 29, and 34 are used in Equation 1. Since u=24 and u=34 have a conjugate symmetry relation, two correlations may be simultaneously performed. Here, conjugate symmetry indicates the relationship of the following Equation.

$$d_n(n)=(-1)^n(d_{N_{ZC}-n}(n))^0, \text{ when } N_{ZC} \text{ is even number}$$

$$d_n(n)=(d_{N_{ZC}-n}(n))^0, \text{ when } N_{ZC} \text{ is odd number} \quad \text{[Equation 2]}$$

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

Where a ZC root sequence index u is given by the following table.

TABLE 3

| $N^{(2)}_{ID}$ | Root index u |
|---|---|
| 0 | 25 |
| 1 | 29 |
| 2 | 34 |

Referring to FIG. 6, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Figure 7:
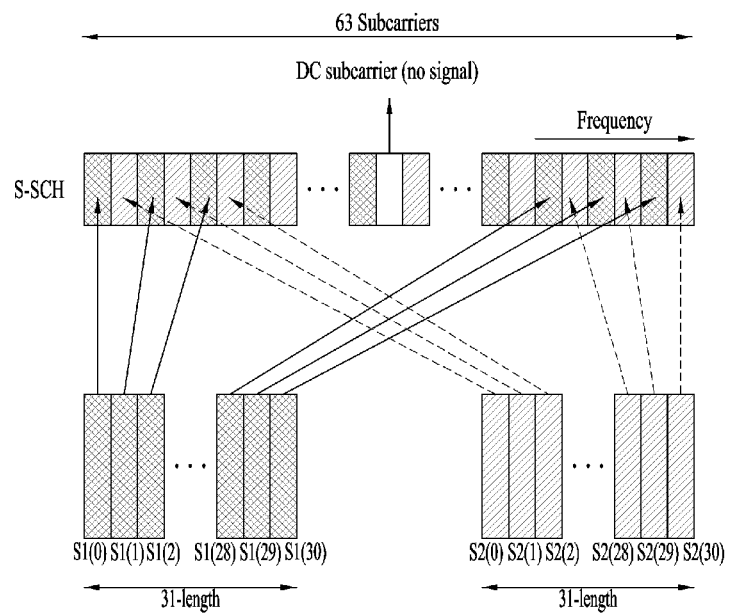
FIG. 7 illustrates a secondary synchronization signal (SSS) generation scheme.

FIG. 7 illustrates an SSS generation scheme. Specifically, FIG. 7 illustrates a relationship of mapping of two sequences in a logical domain to sequences in a physical domain.

A sequence used for the SSS is an interleaved concatenation of two length-31 m-sequences and the concatenated sequence is scrambled by a scrambling sequence given by a PSS. Here, an m-sequence is a type of a pseudo noise (PN) sequence.

Referring to FIG. 7, if two m-sequences used for generating an SSS code are S1 and S2, then S1 and S2 are obtained by scrambling two different PSS-based sequences to the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence d(0), . . . , d(61) used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 as follows.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, 0≤n≤30. Indices $m_0$ and $m_1$ are derived from a physical-layer cell-identity group $N^{(1)}_{ID}$ as follows.

$$m_0 = m' \bmod 31 \qquad \text{[Equation 5]}$$

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

The output of Equation 5 is listed in Table 4 that follows Equation 11.

Two sequences $s^{(m0)}_0(n)$ and $s^{(m1)}_1(n)$ are defined as two different cyclic shifts of an m-sequence $s(n)$.

$$s^{(m0)}_0(n) = s((n+m_0) \bmod 31)$$

$$s^{(m1)}_1(n) = s((n+m_1) \bmod 31) \qquad \text{[Equation 6]}$$

where $s(i)=1-2x(i)$ ($0 \le i \le 30$) is defined by the following equation with initial conditions $x(0)=0$, $x(1)=0$, $x(2)$, $x(3)=0$, $x(4)=1$.

$$x(\bar{i}+5) = (x(\bar{i}+3)+x(\bar{i})) \bmod 2, \ 0 \le \bar{i} \le 25 \qquad \text{[Equation 7]}$$

Two scrambling sequences $c_0(n)$ and $c_1(n)$ depend on the PSS and are defined by two different cyclic shifts of an m-sequence $c(n)$.

$$c_0(n) = c((n+N^{(2)}_{ID}) \bmod 31)$$

$$c_1(n) = c((n+N^{(2)}_{ID}+3) \bmod 31) \qquad \text{[Equation 8]}$$

where $N^{(2)}_{ID} \in \{0,1,2\}$ is a physical-layer identity within a physical-layer cell identity group $N^{(1)}_{ID}$ and $c(i)=1-2x(i)$ ($0 \le i \le 30$) is defined by the following equation with initial conditions $x(0)=0$, $x(1)=0$, $x(2)$, $x(3)=0$, $x(4)=1$.

$$x(\bar{i}+5) = (x(\bar{i}+3)+x(\bar{i})) \bmod 2, \ 0 \le \bar{i} \le 25 \qquad \text{[Equation 9]}$$

Scrambling sequences $Z^{(m0)1}(n)$ and $Z^{(m1)1}(n)$ are defined by a cyclic shift of an m-sequence $z(n)$.

$$z^{(m0)}_1(n) = z((n+(m_0 \bmod 8)) \bmod 31)$$

$$z^{(m1)}_1(n) = z((n+(m_1 \bmod 8)) \bmod 31) \qquad \text{[Equation 10]}$$

where $m_0$ and $m_1$ are obtained from Table 4 that follows Equation 11 and $z(i)=1-2x(i)$ ($0 \le i \le 30$) is defined by the following equation with initial conditions $x(0)=0$, $x(1)=0$, $x(2)$, $x(3)=0$, $x(4)=1$.

$$x(\bar{i}+5) = (x(\bar{i}+4)+x(\bar{i}+2)+x(\bar{i}+1)+x(\bar{i})) \bmod 2, \ 0 \le \bar{i} \le 25 \qquad \text{[Equation 11]}$$

TABLE 4

| $N^{(1)}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |

TABLE 4-continued

| $N^{(1)}_{ID}$ | $m_0$ | $m_1$ |
|---|---|---|
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |
| — | — | — |

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are on the left and the other 3 RBs are on the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 8:
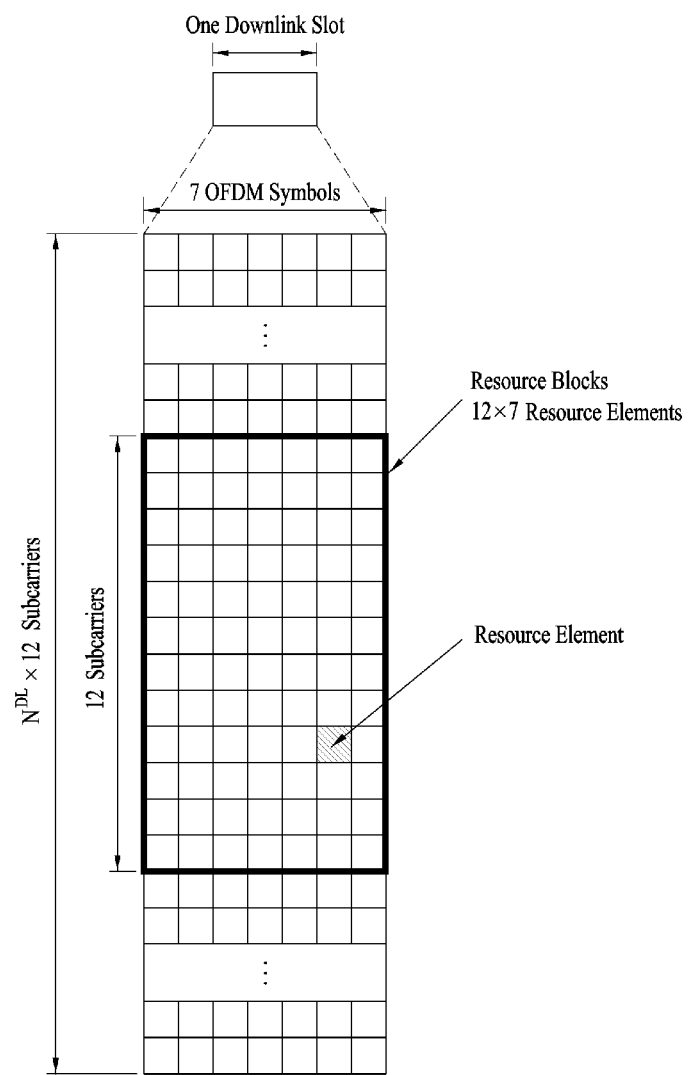
FIG. 8 illustrates a resource grid of a DL slot.

FIG. 8 illustrates a resource grid of a DL slot.

Referring to FIG. 8, a DL slot includes $N_{symb}^{DL}$ OFDM symbols in the time domain and $N_{RB}^{DL}$ in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 8 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE is indicated by one OFDM symbol index and one subcarrier index. One RB includes $N_{symb}^{DL} \times N_{sc}^{RB}$. The number of RBs, $N_{RB}^{DL}$, included in a DL slot depends on DL bandwidth configured in a cell.

Figure 9:
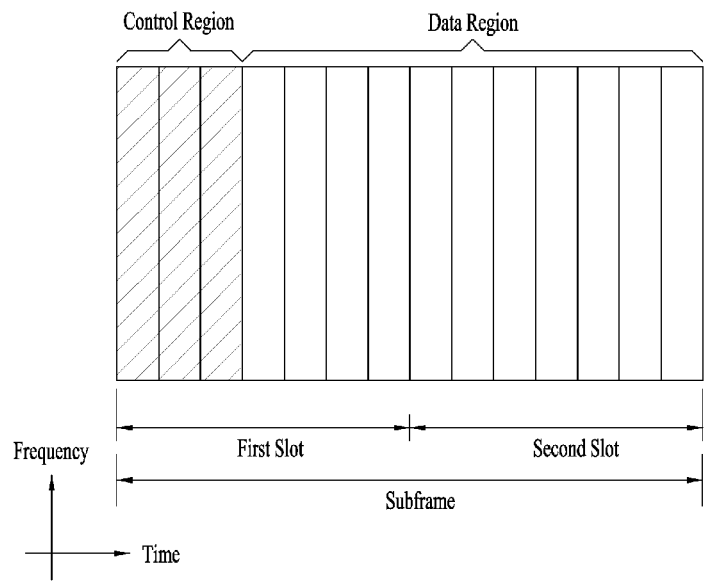
FIG. 9 illustrates the structure of a DL subframe.

FIG. 9 illustrates the structure of a DL subframe.

Referring to FIG. 9, up to three (or four) OFDM symbols at the start of the first slot of a DL subframe are used as a control region to which control channels are allocated and the other OFDM symbols of the DL subframe are used as a data region to which a PDSCH is allocated. DL control channels defined for an LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE corresponds to a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked with an identifier (ID) (e.g. a radio network temporary identifier (RNTI)) according to the owner or use of the PDCCH. If the PDCCH is destined for a specific UE, the CRC may be masked with a cell-RNTI (C-RNTI) of the UE. If the PDCCH carries a paging message, the CRC may be masked with a paging ID (P-RNTI). If the PDCCH carries system information (particularly, a system information block (SIB)), the CRC may be masked with a system information RNTI (SI-RNTI). If the PDCCH is designated as a random access response, the CRC may be masked with a random access-RNTI (RA-RNTI).

Figure 10:
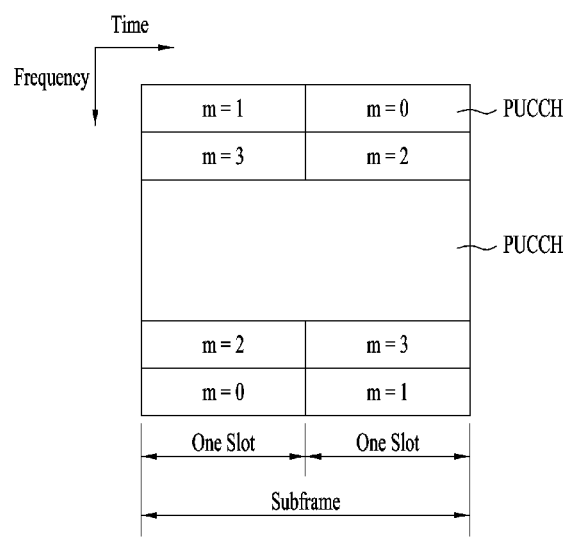
FIG. 10 illustrates the structure of a UL subframe in an LTE system.
Figure 11:
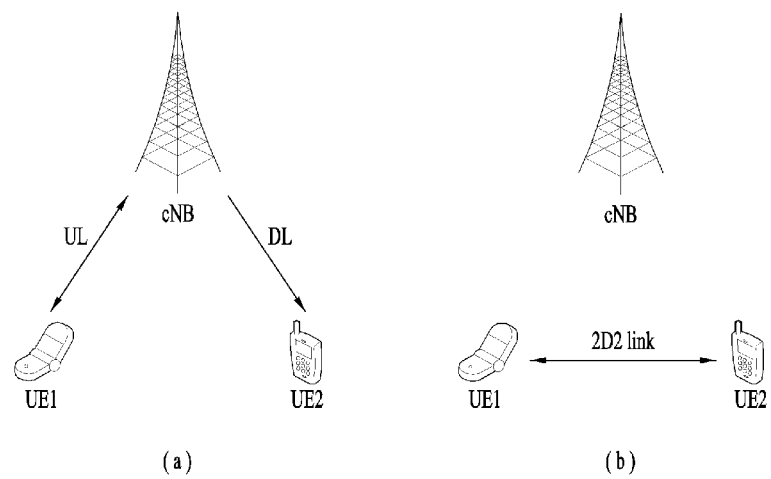
FIG. 11 is a diagram conceptually illustrating D2D communication.

FIG. 10 illustrates the structure of a UL subframe in an LTE system.

Referring to FIG. 10, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary.

The PUCCH may deliver the following control information.

SR: SR is information requesting UL-SCH resources and is transmitted using on-off keying (OOK).

HARQ ACK/NACK: HARQ ACK/NACK is a response signal to a DL data packet received on a PDSCH, indicating whether the DL data packet has been successfully received. 1-bit ACK/NACK is transmitted as a response to a single DL codeword and 2-bit ACK/NACK is transmitted as a response to two DL codewords.

CSI: CSI is feedback information regarding a DL channel CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except for SC-FDMA symbols allocated to RSs in a subframe are available for transmission of control information. If the subframe carries an SRS, the last SC-FDMA symbol of the subframe is also excluded in transmitting the control information. The RSs are used for coherent detection of the PUCCH.

Figure 12:
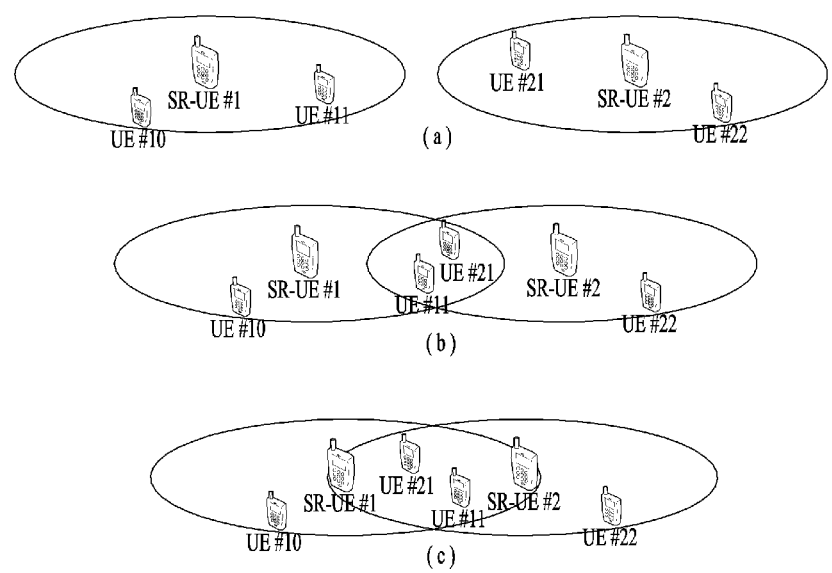
FIGS. 12 and 13 are diagrams referred to for describing the case in which an SR-UE is elected.

FIG. 12 is a diagram conceptually illustrating D2D communication. FIG. 12(a) illustrates a conventional eNB-based communication scheme in which a first UE UE 1 transmits data to an eNB on UL and the eNB transmits the data from the first UE UE 1 to a second UE 2 on DL.

FIG. 12(b) illustrates a UE-to-UE communication scheme as exemplary D2D communication in which data is exchanged between UEs without passing through the eNB. Such a link directly established between devices may be referred to as a D2D link. D2D communication has the advantage of reducing latency relative to the conventional eNB-based communication scheme and requiring fewer radio resources.

Although D2D communication is a scheme of supporting communication between devices (or UEs) without passing through the eNB, since resources of an existing wireless communication system (e.g., 3GPP LTE/LTE-A) are reused to perform D2D communication, D2D communication should not create interference or disturbance with the existing wireless communication system. In the same context, it is also important to minimize interference that a UE or an eNB operating in the existing wireless communication system create during D2D.

Based on the above-described discussion, a method will be described for electing/determining a UE that can be a synchronization reference when there is no synchronization reference such as an eNB in performing D2D communication between UEs proposed in the present invention.

In the present invention, synchronization may include OFDM symbol synchronization and frequency synchronization and, in the case of using a frame structure, also include frame synchronization. Typically, a synchronization signal in a 3GPP LTE system may refer to a signal such as a PSS/SSS that an eNB transmits. An entity corresponding to the synchronization reference may be an entity that transmits the above-described synchronization signal and may be, for example, an eNB in the 3GPP LTE system.

In D2D communication, when a plurality of UEs is synchronized with each other, radio resources can be effectively used. If UEs are located within coverage of an eNB, the UEs may acquire synchronization of each other by being synchronized with time and frequency of the eNB. However, at least some UEs performing D2D communication are out of coverage of the eNB, an entity, such as the eNB, capable of providing a common synchronization reference to UEs performing D2D communication is not present any longer.

Therefore, as a method used for synchronization between UEs, a specific UE may become a synchronization reference to provide synchronization capable of being commonly applied to UEs located within coverage thereof. A UE that provides a synchronization reference signal is defined as a synch-reference signal (RS) UE, a synchronization reference (SR)-UE, or a cluster head and a set of UEs synchronized with the SR-UE is defined as a (D2D) cluster.

In the above-described case, a method as to which UE is to be elected as an SR-UE from among D2D UEs is needed. In electing the SR-UE, it is necessary to configure a network type in which too many unsynchronized clusters do not overlap each other and, at the same time, to synchronize all UEs in a normal UE distribution with a specific cluster.

Therefore, a UE may determine whether the UE will be an SR-UE or the UE will be synchronized with another SR-UE according to the following steps 1 to 4 and perform an operation defined in each step.

SR-UE determination step 1: The UE scans for an SR signal during a scanning time period.

SR-UE determination step 2: The UE determines whether to participate in contention for becoming an SR-UE. If the UE does not participate in contention, the UE performs SR-UE determination step 3. However, if the UE participates in contention for being elected as the SR-UE, the UE proceeds to SR-UE determination step 4.

SR-UE determination step 3: The UE joins a cluster of one or more SR-UEs. For transmission in a specific resource region, the UE uses an SR signal linked to the corresponding resource region.

SR-UE determination step 4: The UE participates in contention for SR signal transmission. A scheme is used in which random backoff is set and a UE, a random backoff interval of which ends first, wins contention.

In this case, a resource corresponding to a specific time period may be reserved for one SR. The size/amount of the time period may be predetermined and may be transmitted through a SR signal. In other words, information about the size of the time period may be embedded in the SR signal or may be included in a message region designated through the SR signal.

In determining whether to participate in contention for becoming the SR-UE (i.e., SR-UE determination step 2), the strength of a received SR signal may be considered. For example, a predetermined threshold value may be set. If the strength of the received SR signal is greater than the threshold value, the UE may not participate in contention and, if the strength of the received SR signal is less than the threshold value, the UE may operate to participate in contention.

FIG. 12 is a diagram referred to for describing the case in which an SR-UE is elected.

In FIG. 12, SR-UE #1 first scans an SR signal. If SR-UE #1 finds no SR signal in this SR signal scanning procedure (i.e., SR-UE determination step 1), SR-UE #1 determines to participate in contention for becoming an SR-UE (i.e., SR-UE determination step 2). Therefore, SR-UE #1 may select a random backoff number as in SR-UE determination step 4 described above, perform as many backoff procedures as backoff slots (in this case, it may be assumed that the backoff slots are generally less than a subframe duration and greater than a symbol duration), and reserves a specific resource period to perform D2D communication together with UEs (UE #10 and UE #11) synchronized therewith.

Further, if the resource reservation period is ended, SR-UE #1 may participate in contention again.

In this case, upon receiving an SR signal less than a threshold value, transmitted by SR-UE #1, a UE may perform SR-UE determination steps 1 to 4 described above at a timing thereof and then form a cluster thereof by independently performing contention with SR-UE #1. For example, in FIG. 12(*a*) and FIG. 12 (*b*), because the SR signal received from SR-UE #1 is less than the threshold value, SR-UE #2 may perform the SR-UE determination step for being elected as an SR-UE according to a timing thereof and perform D2D communication by forming a cluster with UE #21 and UE #22.

Alternatively, as illustrated in FIG. 12(*c*), a UE that receives an SR signal less than the threshold value, transmitted by SR-UE #1, but can decode the SR signal may participate in contention and may be elected as an SR-UE.

Figure 13:
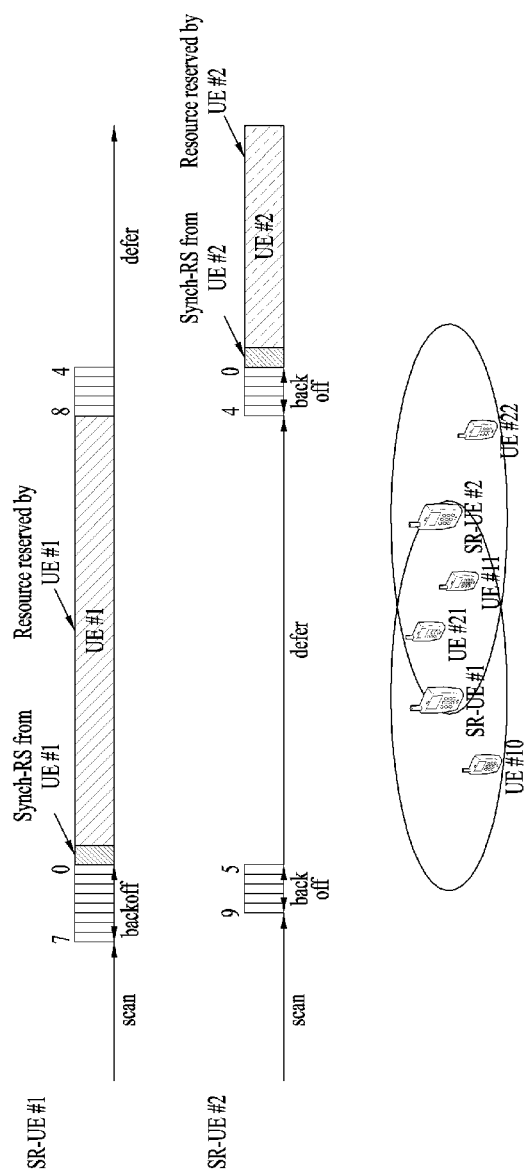

FIG. 13 is a diagram referred to for describing in more detail the case of FIG. 12(*c*). It is assumed in FIG. 13 that, although SR-UE #2 receives an SR signal of SR-UE #1 less than a threshold value, SR-UE #2 can decode the SR signal.

In this case, if SR-UE #2 determines to participate in contention in SR-UE determination step 2, SR-UE #2 may be aware of a resource period reserved by SR-UE #1 by receiving the SR signal transmitted by SR-UE #1 in a scanning procedure or a backoff procedure. That is, if the resource period reserved by SR-UE #1 ends, contention (between SR-UE #1 and SR-UE #2) may be started or previous contention may be restarted (or may continue). In addition, UEs (i.e., UE #11 and UE #21) that can receive both SR signals from SR-UE #1 and SR-UE #2 may be synchronized with SR-UE #1 during the reserved resource period of SR-UE #1 to perform D2D communication and may be synchronized with SR-RE #2 during the reserved resource duration of SR-UE #2 to perform D2D communication.

Furthermore, an entire resource region may be divided into a plurality of regions and a specific SR signal may be linked to a specific resource region.

Figure 14:
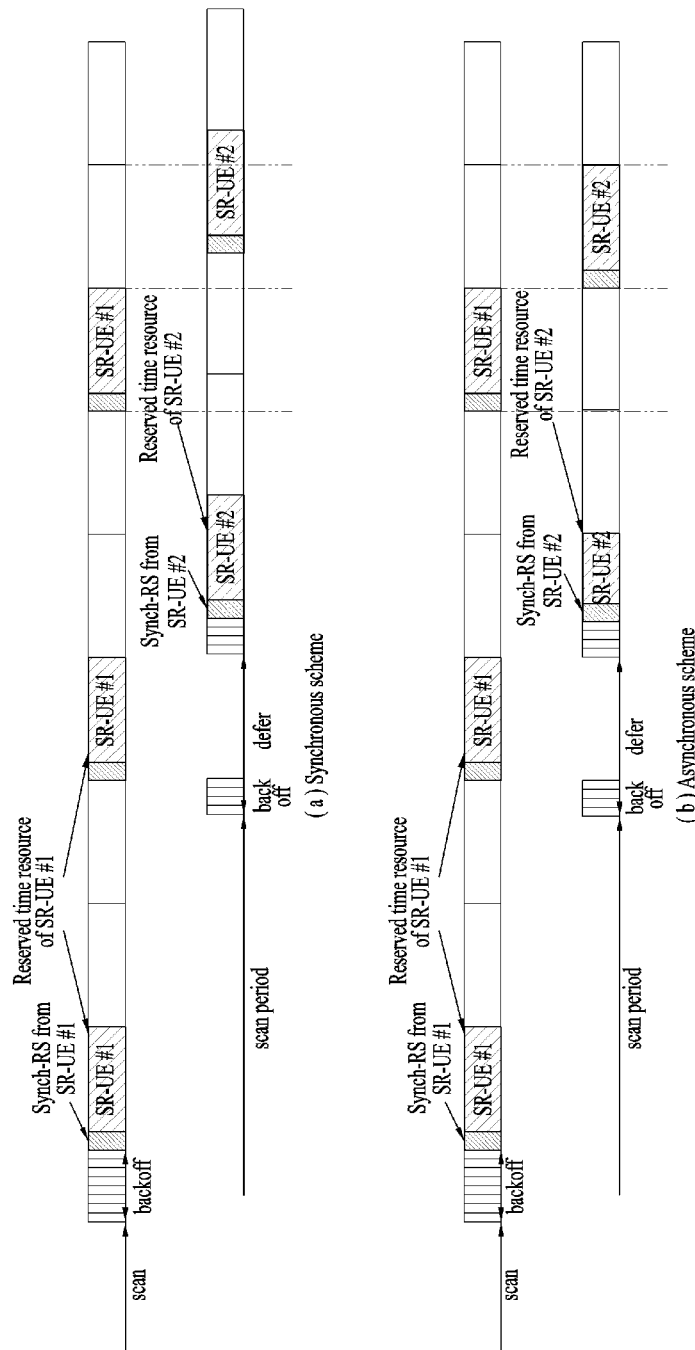
FIG. 14 is a diagram referred to for describing the case in which a specific SR signal is linked to a specific resource region according to the present invention.

FIG. 14 is a diagram referred to for describing the case in which a specific SR signal is linked to a specific resource region according to the present invention. Referring to FIG. 14, as an example of classifying an entire resource region into N regions, a resource unit consisting of multiple subframes is defined and an entire resource may be configured in the form of repeating resource units of sequential indexes (e.g., 1, 2, . . . , N, 1, 2, N). In this case, the SR signal may include information about a resource region linked thereto.

More specifically, an operation of the present invention to which the above-described resource region division scheme is applied is described. That is, when a UE determines whether to participate in contention to be elected as an SR-UE, the UE considers the strength of a received SR signal. If resource regions linked to the SR signal are distinguishable resource regions, the case may occur in which the strength of the SR signal exceeds a threshold value in a specific resource region and the strength of the SR signal does not exceed the threshold value in another resource region.

In this case, whether to participate in contention to be elected as an SR-UE may be determined according to the following criteria.

Contention participation criterion 1: If there is any one signal exceeding the threshold value, a UE is synchronized with an SR-UE that transmits the corresponding signal. That is, the UE performs SR-UE determination step 3.

Contention participation criterion 2: Even when a signal exceeding a threshold value is present, no signal exceeding the threshold value is found in a region except for a resource region linked to the corresponding signal, a UE participates in contention. That is, SR-UE determination step 4 described above is performed.

In this case, the number of UEs becoming SR-UEs decreases when contention participation criterion 1 is used as compared with the case of using contention participation criterion 2. That is, a probability of being elected as the SR-UE decreases.

Contention for being elected as the SR-UE in SR-UE determination step 4 may be performed according to the following schemes.

SR-UE contention scheme 1: A scheme of performing random backoff without determining a resource region to be used.

In SR-UE determination step 4, a contention procedure is performed as in the case in which a resource region is not divided and a UE that wins contention may transmit an SR signal starting from a backoff completion time. In other words, a resource region to be reserved at a backoff completion time is determined. This resource region may be reserved by asynchronously configuring a resource region non-overlapping a resource region of another SR-UE as illustrated in FIG. 14(a) or may be synchronously configured as illustrated in FIG. 14(b).

When a synchronous scheme is used, the SR signal should include information about a boundary so as to recognize the boundary of divided resource regions. (e.g., a value as to after how many symbols or after how many subframes the boundary of divided resource regions is located).

SR-UE contention scheme 2: A scheme of performing random backoff after determining a resource region to be used.

For divided resource regions, some of resource regions unoccupied by another SR-UE are selected to be used and backoff is performed with respect only to corresponding resource regions.

Figure 15:
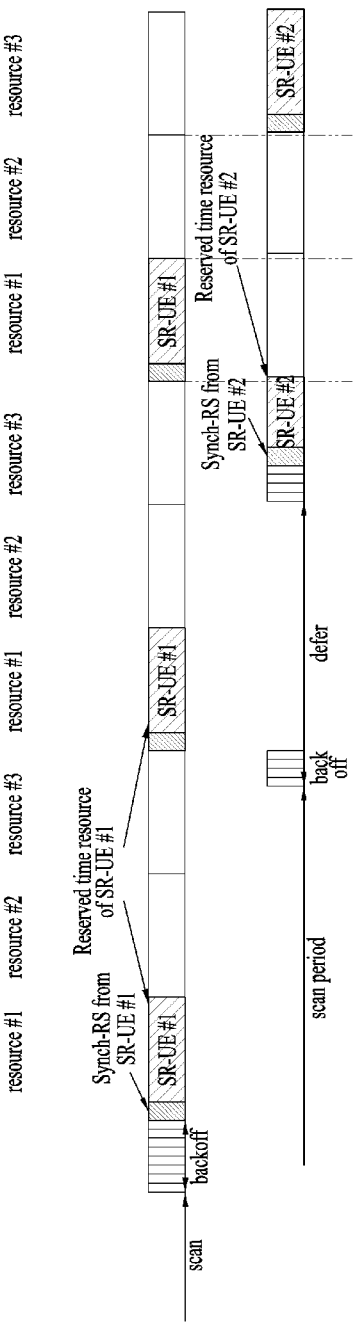
FIG. 15 is a diagram referred to for describing an SR-UE contention scheme according to the present invention.

FIG. 15 is a diagram referred to for describing SR-UE contention scheme 2. Referring to FIG. 15, it can be appreciated that, unlike SR-UE contention scheme 1, if SR-UE #2 selects resource region 3 from among three divided regions, a backoff procedure is not performed with respect to resource region 2 in SR-UE contention scheme 2.

Although a maximum backoff value that can be selected when random backoff is performed in SR-UE determination step 4, i.e., a backoff window, is set to the same value, the effect of random backoff may vary according to which contention scheme (e.g., SR-UE contention scheme 1 or SR-UE contention scheme 2 described above) is used.

In other words, as an interval capable of completing backoff increases, an effect of selecting a random value from a small backoff window may arise. For example, in FIG. 15, decreasing backoff only in resource region 3 by determining that only resource region 3 can be used may be regarded as configuring a very large backoff value relative to decreasing a backoff value in both resource region 2 and resource region 3 by determining that both resource region 2 and resource region 3 can be used. To solve such inequality, a valid backoff window may be defined. The valid backoff window may be defined as normalizing a commonly applied backoff window value to the amount of usable resource regions.

In this case, as described in FIG. 13, UEs (e.g., UE #11 and UE #21) that can receive signals from SR-UE #1 and SR-UE #2 may be synchronized with SR-UE #1 in a resource reservation period of SR-UE #1 to perform D2D communication and may be synchronized with SR-UE #2 in a resource reservation period of SR-UE #2 to perform D2D communication.

Meanwhile, since an SR-UE that wins contention reserves and uses a resource, if resource reservation is statically performed, it is difficult to factor in UE mobility and a time-varying network characteristic and an inequality problem in which only a specific UE continues to operate as an SR-UE may occur. Accordingly, to solve the above problems, a valid time period capable of operating as the SR-UE may be preset or the valid time period may be included in an SR signal. Upon receiving the SR signal including the valid time interval, UEs may be aware of a remaining valid time and, if the valid time expires, the UEs may resume performing random backoff starting from an end time of the valid time regardless of whether the UEs operate as SR-UEs. In addition, an SR-UE (e.g., SR-UE #1) that has acquired a valid time from another SR-UE (e.g., SR-UE #2) may transmit an SR signal including a remaining valid time of the other SR-UE (i.e., SR-UE #2) except for an already consumed valid time thereof (i.e., SR-UE #1) so as to apply the same valid time. Using this method, if a predetermined time period elapses, all UEs or SR-UEs that are synchronized based on a specific SR-UE may simultaneously perform contention again in the same condition.

That is, in SR-UE determination step 1, if no SR signal greater than a threshold value is received or a reserved valid time period expires, a UE may participate in contention for electing an SR-UE and performs a random backoff procedure as in SR-UE determination step 4. The random backoff procedure may be continuously performed while deferring backoff in a corresponding reservation duration transmitted from another SR-UE or the random backoff procedure may be performed in a corresponding resource region by selecting an available resource region after acquiring synchronization from the corresponding SR-UE.

Further, upon receiving an SR signal from an SR-UE, a UE may relay the received SR signal in the same SR transmission period as that of the SR-UE or relay the received SR signal in an SR transmission period different from that of the SR-UE. For convenience of description, a UE that receives an SR signal from an SR-UE and then relays the received SR signal will be referred to as an SR-relay UE. However, the SR-relay UE should not be interpreted as a UE for simply relaying the SR signal and, in some cases, the SR-relay UE should be interpreted as a UE that can relay a signal other than the SR signal.

Figure 16:
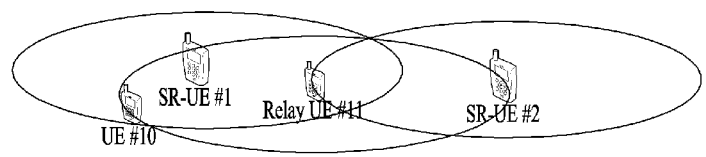
FIGS. 16 and 17 illustrate the case in which an SR-relay UE (e.g., UE #11) that has received an SR signal of an SR-UE (e.g., SR-UE #1) relays the SR signal.
Figure 17:
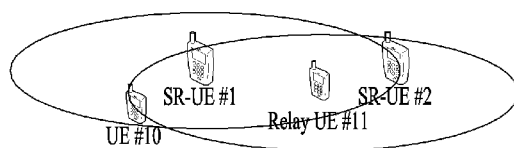

FIGS. 16 and 17 illustrate the case in which an SR-relay UE (e.g., UE #11) that has received an SR signal of an SR-UE (e.g., SR-UE #1) relays the SR signal.

In FIG. 16, it is assumed that UE #2 can operate as an SR-UE. As opposed to FIG. 13, even when SR-UE #2 is out of coverage of SR-UE #1, if SR-UE #2 can receive resource reservation information of SR-UE #1 from UE #11 corresponding to an SR-relay UE, SR-UE #2 may form a cluster thereof (i.e., UE #12) by reserving a resource region while excluding a corresponding resource.

In this case, whether a UE becomes a new SR-UE is determined by the size of a signal directly detected from another SR-UE. In the case in which an adjacent UE relays information of another SR-UE, even when a signal of large size is received from the adjacent UE, if a level of a signal directly received from the SR-UE is low, the UE may still perform contention for becoming the SR-UE.

Accordingly, as illustrated in FIG. 17, even when UE #11 operates as an SR-relay UE and an SR signal that SR-UE #2 receives through the SR-relay UE (i.e., UE #11) is greater than a threshold value, if a level of a signal received from SR-UE #1 does not exceed the threshold value, SR-UE #2 may participate in contention.

SR Relay and Frame Structure

Hereinafter, the structure of an SR signal transmitted by an SR-relay UE according to the present invention will be described.

A transmission resource of an SR signal that an SR-relay UE relays may be defined in many ways. For example, a UE that receives an SR signal transmitted by an SR-UE may transmit the same signal in the same resource region as a resource region used by the SR-UE starting from the next SR transmission period after an SR transmission period elapses.

As another example, an SR signal transmission period for the SR-relay UE may be defined. In this case, the SR signal relayed by the SR-relay UE may not be the same as the SR signal of the SR-UE. The SR signal transmission period of the SR-relay UE may be (consecutively) allocated after an SR signal transmission period of the SR-UE or may be allocated within the SR signal transmission period of the SR-UE once or repeatedly (specific numbers of times) with a specific interval. The specific interval may be predetermined or may be included in a higher layer signal (e.g., RRC) or in a signal transmitted by the SR-UE.

Figure 18:
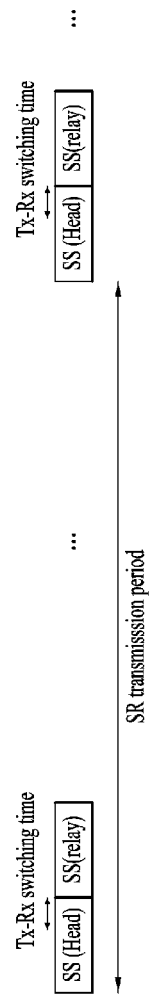
FIG. 18 illustrates the case in which an SR signal transmission resource region of an SR-relay UE and an SR signal transmission resource region of an SR-UE are consecutively allocated.

FIG. 18 illustrates the case in which an SR signal transmission resource region of an SR-relay UE and an SR signal transmission resource region of an SR-UE are consecutively allocated. In FIG. 18, since the SR-relay UE should transmit an SR signal in the next resource region (e.g., subframe) after receiving the SR signal from the SR-UE, a transmission (Tx)-reception (Rx) switching period (e.g., a guard time) needs to be defined between the SR signal transmission region of the SR-UE and the SR signal transmission region of the SR-relay UE.

Figure 19:
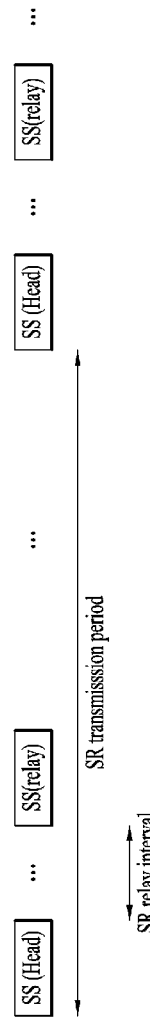
FIG. 19 illustrates the case in which an SR signal transmission resource region of an SR-relay UE is allocated after a specific interval from an SR signal transmission resource region of an SR-UE.

FIG. 19 illustrates the case in which an SR signal transmission resource region of an SR-relay UE is allocated after a specific interval, i.e., an SR relay interval, from an SR signal transmission resource region of an SR-UE. Although, in FIG. 19, the SR transmission resource region of the SR-relay UE is allocated once within one SR transmission period, the present invention is not limited to the case shown in FIG. 19 and it should be interpreted that the present invention may be applied even when a plurality of resource regions having a plurality of intervals is allocated.

Especially, when an interval consists of multiple subframe units, an interval value/size may vary according to FDD and TDD. For example, while an interval in FDD may be provided as subframes corresponding to a multiple of 4 or 8 and an interval in TDD may be provided as subframes corresponding to a multiple of 5 or 10. Therefore, when an interval is 8 subframes in FDD, if the SR signal transmission subframe of the SR-UE is #n, the SR signal transmission resource region of the SR-relay UE may be allocated in #n+8 (or #n+8, #n+16, . . . etc.).

In addition, one or more relays may be configured to relay an SR signal using resource regions divided in a frequency region as well as in a time region. Especially, the frequency region in which the SR signal is relayed may not be equal to an SR signal transmission frequency region of the SR-UE. For example, when the SR-UE uses center 6 RBs, the SR-relay UE may use frequency regions other than the center 6 RBs and different SR-relay UEs may use different frequency regions.

The SR-UE may repeatedly reserve a specific resource region (i.e., a specific repeated resource region) to be used for D2D communication in a cluster thereof and information about the specific resource region may be broadcast by being included in the SR signal.

Figure 20:
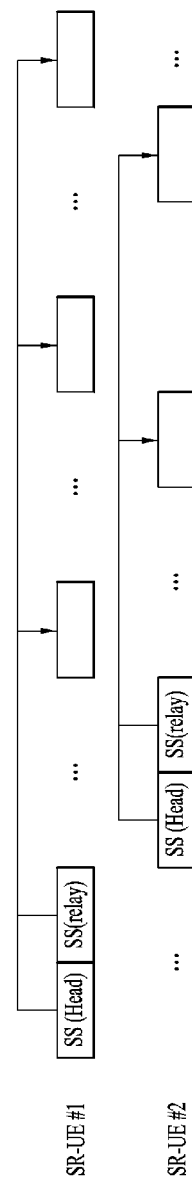
FIG. 20 illustrates the case in which specific repeated resource regions are reserved by an SR-UE and allocated to D2D communication.

FIG. 20 illustrates the case in which specific repeated resource regions are reserved by an SR-UE and allocated to D2D communication. SR-UE #2 that has received information about corresponding resource regions from an SR-relay UE of SR-UE #1, i.e., from SR-relay UE #11, may select resource regions to be used thereby (i.e., SR-UE #2) excluding resource regions reserved by SR-UE #1. In this case, a D2DSS may indicate an SR signal or include the SR signal.

Information about the reserved resource region may include a transmission interval from an SR signal transmission timing and a transmission period and include a count indicating how many times the resource region is repeated and a transmission end timing. Resource reservation information transmitted by a relay may be equal to resource reservation information included in a D2DSS transmitted by an SR-UE when a timing at which an SR-relay UE transmits the D2DSS is predetermined, i.e., when a reception UE is aware of a corresponding D2D transmission timing. If the reception UE is not aware of the D2D transmission timing (and/or if a timing at which the SR-relay UE transmits the D2DSS is not predetermined), the resource reservation information transmitted by the relay may be (re)configured according to the D2DSS timing at which the SR-relay UE transmits the D2DSS.

Meanwhile, when a cluster formed by the SR-UE corresponds to partial coverage, the information about a corresponding reserved resource region may include information about a resource region explicitly used in WAN communication or a resource region excluding the resource region used in WAN communication may be reserved. In addition, a resource region in which the SR-relay UE relays the SR signal may be identically reserved.

D2D data communication using a resource reserved by each cluster may be performed using a scheme in which an SR-UE schedules transmission and reception resource regions of UEs or a distributed scheme only on the reserved resource. When the distributed scheme is used, for example, if reservation information is transmitted in the D2DSS, a specific part of a first appearing resource region (e.g., a first appearing subframe etc.) may be used as a D2D communication contention duration and an SR-UE elected in the contention duration may perform D2D transmission or reception using a remaining reservation resource.

Meanwhile, a transmission period of the D2DSS may be changed using a scheme of repeatedly transmitting some or all of the D2DSS or additionally inserting a garbage signal (a dummy signal that does not include information). The reason is to solve a problem in the case in which, when a contention-based resource is initially reserved, a random backoff completion time of an SR-UE is not equal to the boundary of resource region periods divided by the SR-UE that has first reserved the resource.

Figure 21:
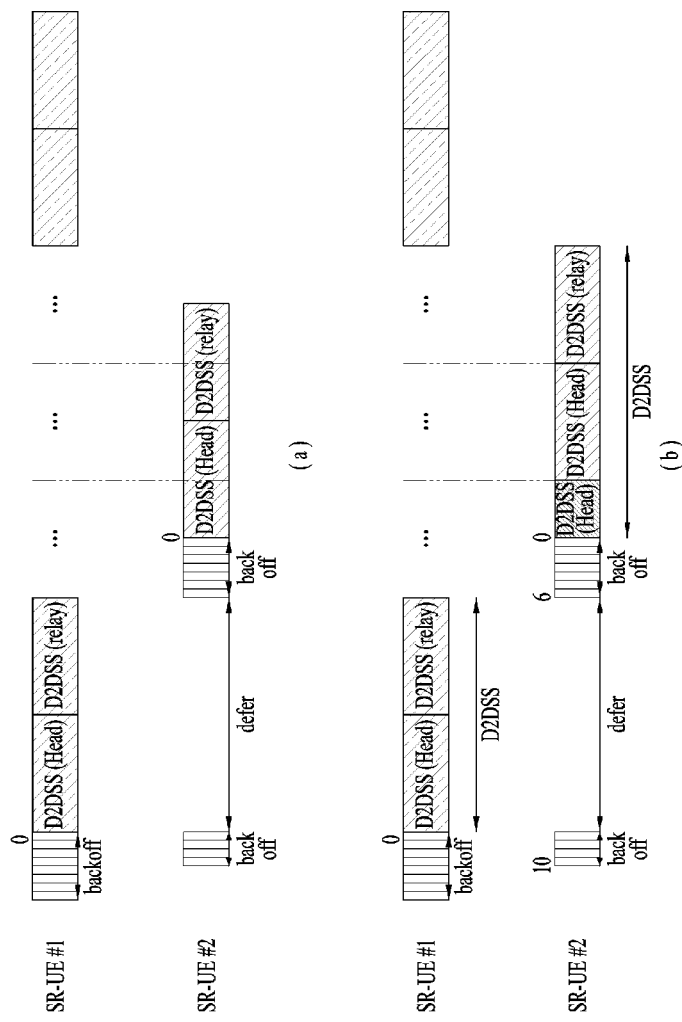
FIG. 21 illustrates the case in which a random backoff completion time of a D2DSS is not equal to the boundary of resource region durations divided by an SR-UE.

FIG. 21 illustrates the case in which a random backoff completion time of a D2DSS is not equal to the boundary of resource region periods divided by an SR-UE. In FIG. 21(a), backoff is ended in the middle of a subframe and SR-UE #2 may attempt to transmit the D2DSS. As illustrated in FIG. 14, although such a resource reservation scheme may be one embodiment that is operable in the present invention, a resource region boundary of SR-UE #2 becomes different from that of SR-UE #1, thereby causing a problem such as inefficient resource use. Therefore, when backoff is ended in the middle of a subframe, the D2DSS may be repeatedly transmitted until the start timing of the next subframe to consecutively occupy a resource, as illustrated in FIG. 21(b). Then, a subframe boundary can be equalized with a resource boundary of SR-UE #1. That is, upon transmitting the D2DSS, if a backoff completion timing is not identical to a subframe boundary, the SR-UE may repeatedly transmit the D2DSS so as to continuously occupy the resource until the start timing of the next subframe boundary, thereby preoccupying a resource region in a subframe equalized state.

Accordingly, a threshold/configuration/regulation indicating that the SR-UE should transmit the D2DSS a predetermined number of times or more, that is, indicating a minimum transmission number of times, may be present. Further transmission exceeding the minimum transmission number of times may be optionally configured according to a given situation such as a radio communication environment. For example, if the backoff completion timing is located in the middle of a subframe, additional transmission of the D2DSS exceeding the minimum transmission number of times may be performed and the additionally transmitted number of times may be flexibly configured up to the boundary timing of the next subframe. However, if the backoff completion timing is not located in the middle of a subframe, the D2DSS may be configured to be transmitted only the minimum transmission number of times.

Figure 22:
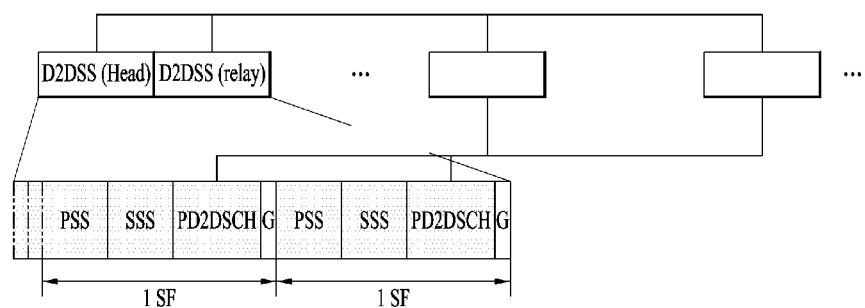
FIG. 22 is a diagram referred to for indicating a detailed example of a D2DSS signal.

FIG. 22 is a diagram referred to for indicating a detailed example of a D2DSS. In FIG. 22, it is assumed that a D2DSS of an SR-relay UE is consecutively transmitted after a D2DSS signal of an SR-UE is transmitted. It is assumed that a D2DSS is configured such that each of a PSS and an SSS is repeated four times and then a physical D2D synchronization channel (PD2DSCH) appears so that the D2DSS is configured by PSS (4+α symbols)+SSS (4 symbols)+ PD2DSCH (6 symbols). A UE ID etc. may be obtained from the PSS and the SSS and resource reservation information may be transmitted on a PD2DSCH.

In FIG. 22, an example of variably configuring the number of times of PSS repetitions is shown in order to variably define a D2DSS transmission period. That is, an SR-UE should repeatedly transmit the PSS at least four times and, only when random backoff ends in the middle of a subframe, the SR-UE may optionally increase the number of times of PSS transmission by α (where α is defined as one of 0 to 11 or 13).

Further, various modifications may be made. The PSS and SSS may be distinguished and an SS specific to such usage may be separately defined so that the SS can be repeatedly transmitted a predetermined number of times before or after PSS transmission.

Multi-Hop Relaying of SR

Even when a UE does not directly receive a D2DSS/ PD2DSCH from an SR-UE (i.e., an SR signal received from the SR-UE is less than a threshold value), if the UE receives the D2DSS/PD2DSCH from an SR-relay UE (i.e., an SR signal received from the relay UE is greater than the threshold value), the UE may operate as the SR-relay UE similarly to the above-described relaying scheme of an SR according to the present invention. That is, when multi-hop relaying is performed according to the present invention, the D2DSS etc. may be transmitted through multiple hops and the size of a cluster synchronized with one SR-UE may increase in proportion to the square of the number of hops.

In this case, the number of hops through which the D2DSS etc. is relayed may be limited to properly regulate the size of a cluster using the same SS. To this end, the D2DSS/PD2DSCH may include a hop count. That is, when a UE determines whether to relay the D2DSS/PD2DSCH received thereby, the UE checks the hop count of the D2DSS/PD2DSCH received thereby. If the hop count is greater than a predetermined value (e.g., N), the UE does not operate as the SR-relay UE and, if the hop count is less than or equal to the predetermined value (i.e., N), the UE operates as the SR-relay UE. If the UE receives multiple D2DSSs/ PD2DSCHs having different hop counts, the UE may determine whether to relay the D2DSSs/PD2DSCHs based on a minimum hop count or a maximum hop count. In this case, upon performing a relaying operation, the UE should set the hop count of a D2DSS/PD2DSCH transmitted thereby to a value obtained by adding 1 to the minimum hop count of a received D2DSS/PD2DSCH.

Meanwhile, whether the UE that has received the D2DSS/ PD2DSCH operates as the SR-UE may be determined similarly to the above case of one-hop relaying. That is, if the hop count of the D2DSS/PD2DSCH received with the threshold value or more is greater than a predetermined value (K, where K≤N), the UE may operate as the SR-UE. That is, the UE may participate in contention. The predetermined value (i.e., K) may be transmitted through the D2DSS/PD2DSCH. The UE may receive multiple D2DSSs/ PD2DSCHs having different hop counts. In this case, whether the UE operates as the SR-UE is determined based on i) a minimum or maximum hop count or ii) a D2DSS/ PD2DSCH having received power of the best quality. The case in which whether the UE operates as the SR-UE is determined based on the quality of received power will now be described by way of example. If D2DSSs/PD2DSCHs transmitted from the same SR-UE are relayed by different UEs using different resources, one UE may receive multiple different D2DSSs/PD2DSCHs having the same hop count and, in this case, whether the UE operates as the SR-UE may be based on the quality of a signal into which the D2DSSs/ PD2DSCHs of the same hop count originated from the same SR-UE are combined as one received signal.

Figure 23:
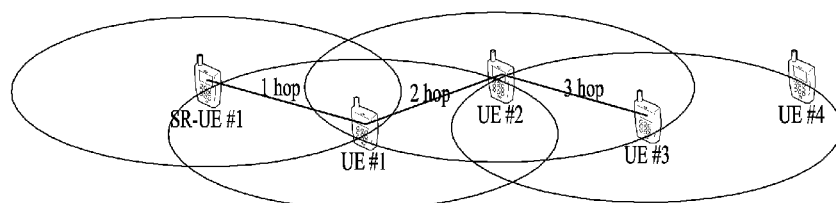
FIG. 23 is a diagram referred to for describing a multi-hop relay of an SR.

FIG. 23 is a diagram referred to for describing a multi-hop relay of an SR. In FIG. 23, it is assumed that a threshold value (i.e., N) used to determine whether to relay a D2DSS/ PD2DSCH is set to 3 and a threshold (i.e., K) of a hop count of the D2DSS/PD2DSCH is set to 2. In this case, N and K may be predetermined, may be configured through higher layer signaling (e.g., RRC), or may be included in a physical layer signal (e.g., a D2DSS/PD2DSCH).

In FIG. 23, UE #1 that has received a D2DSS/PD2DSCH from SR-UE #1 relays the D2DSS/PD2DSCH including information of "hopcount=2" in a relay D2DSS/PD2DSCH transmission period (herein, this period may be the same or different from a D2DSS/PD2DSCH transmission duration of the SR-UE). Upon receiving the D2DSS/PD2DSCH, UE #2 relays the D2DSS/PD2DSCH including information about "hopcount=3" and, similarly, upon receiving D2DSS/ PD2DSCH, UE #3 relays the D2DSS/PD2DSCH including information of "hopcount=4". However, UE #4 that has received the D2DSS/PD2DSCH relayed from UE #3 does not operate as an SR-relay UE because the hop count of UE #3 is greater than N=3.

Meanwhile, the K value serves to properly maintain the number of SR-UEs and may be different from the value N. If K and N are different, the UE may operate as an SR-UE even upon receiving the D2DSS/PD2DSCH corresponding to hopcount=K+1, . . . , N. Accordingly, in FIG. 23, UE #3 as well as UE #4 may operate as an the SR-UE.

Especially, coverage is important in an SR signal such as the D2DSS/PD2DSCH and an upper limit of power of the SR signal may be higher than a normal communication signal. That is, the upper limit of power of the communication signal may be adjusted by an eNB through an SR-relay UE in a partial coverage case. Even in this case, the SR signal such as the D2DSS/PD2DSCH (e.g., direct transmission of a cluster head or relaying transmission of UEs) may be transmitted at higher transmission power than transmission power of the communication signal. For example, while the upper limit value of power of the communication signal is transmitted through the SR signal such as the D2DSS/PD2DSCH, the SR signal may use a larger value than the upper limit value of the communication signal. For example, the transmission power value of the SR signal may use the maximum transmission power of a UE, a new upper limit value obtained by adding a predetermined offset to the upper limit of power of the communication signal, a specific value obtained through the D2DSS/PD2DSCH, or a preconfigured value.

Figure 24:
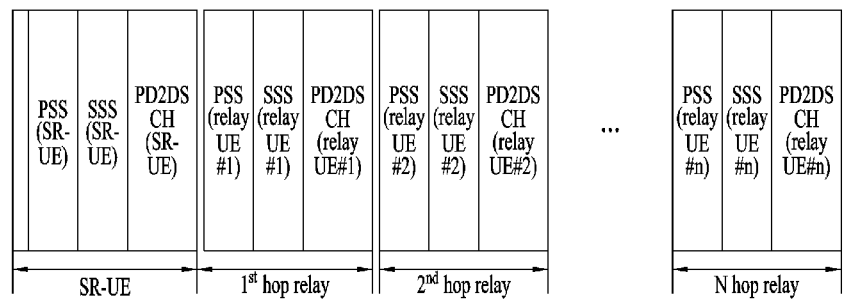
FIGS. 24 and 25 are diagrams referred to for describing a resource region for relay signal transmission.
Figure 25:
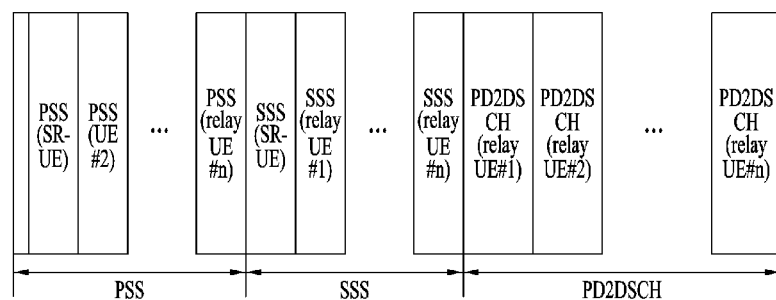

FIGS. 24 and 25 are diagrams referred to for describing a resource region for relay signal transmission.

A D2DSS/PD2DSCH transmission resource of an SR-relay UE may be transmitted using divided resource regions as described in FIGS. 18 to 23. FIG. 24 illustrates the case in which, after an SR-UE transmits an SR signal such as D2DSS/PD2DSCH, relay signal transmission periods of first, . . . N-th hop are configured. A predetermined gap may be present between relay periods in consideration of Tx-Rx switching.

As illustrated in FIG. 25, in order to enable a relaying operation of N hops, N divided D2DSS/PD2DSCH transmission periods may be configured and relaying may be sequentially performed with respect to a part of the D2DSS and to the PD2DSCH. In this case, a guard period is needed for Tx-Rx switching between a part of the D2DSS and the PD2DSCH transmitted with different hops. The relaying scheme as illustrated in FIG. 25 may be effective in solving the hidden node problem.

SR-UE Selection

Hereinabove, a method for determining whether a UE operates as an independent SR-UE or an SR-relay UE, based on the quality (signal-to-interference-plus-noise ratio (SINR), reference signal received power (RSRP), etc.) of the received D2DSS/PD2DSCH or on a hop count, has been described.

Hereinafter, a method for determining with which SR-UE the UE that received distinguishable D2DSSs/PD2DSCHs from a plurality of SR-UEs is synchronized will be described.

In this case, a plurality of SR-UEs may include both an SR-UE corresponding to a synchronization source and an SR-relay UE (for relaying an SR). Selection of an SR-UE for synchronization may be interpreted as selection of a D2DSS/PD2DSCH for synchronization and includes the case in which two or more SR-UEs transmit the same SS in the same resource region.

Figure 26:
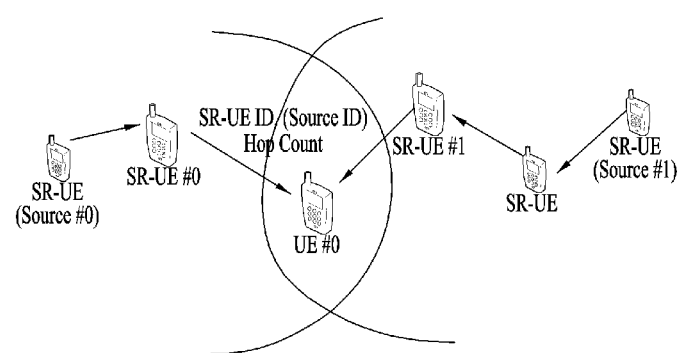
FIG. 26 illustrates the case in which an arbitrary UE receives distinguishable D2DSSs/PD2DSCHs from a plurality of SR-UEs.

FIG. 26 illustrates the case in which an arbitrary UE receives distinguishable D2DSSs/PD2DSCHs from a plurality of SR-UEs. For example, UE #0 may (simultaneously) receive D2DSSs/PD2DSCHs from SR-UE #0 and SR-UE #1. In this case, when the UE selects an SR-UE to be synchronized therewith based on the quality of the received SS as described above, the following operations may be performed.

SR-UE selection scheme #1: a) The case in which one or more SR-UEs have the quality of a received SS greater than a specific level γ. a-1) Upon receiving an SS from one SR-UE, the UE is synchronized with an SR-UE that has transmitted the SS. a-2) Upon receiving SSs from two or more SR-UEs, the UE is synchronized with an SR-UE having the lowest hop count. If two or more SR-UEs have the lowest hop count, the UE may randomly select an SR-UE and is synchronized with the selected SR-UE. However, b) if the quality of all received SSs is less than the specific level γ, the UE may operate as an independent synchronization source.

SR-UE selection scheme #2: Although SR-UE selection scheme 1 is used, the UE may operate to be synchronized with an SR-UE having the best quality among received SSs even when the quality of all received SSs is less than the specific level γ, as opposed to the SR-UE selection scheme 1.

SR-UE selection scheme #3: When an SR-UE having signal quality higher than a first quality level γ or more among received SSs is not present, the above scheme may be used to select an SR-UE with which a UE is to be synchronized by applying a second signal quality level. That is, signal quality reference values of multiple levels may be defined. If no SR-UE satisfies a first reference value, an SR-UE satisfying the reference value of the next level is selected. For example, reference values of N levels may be defined as $\gamma(0) > \gamma(1) > \ldots > \gamma(N-1)$.

Figure 27:
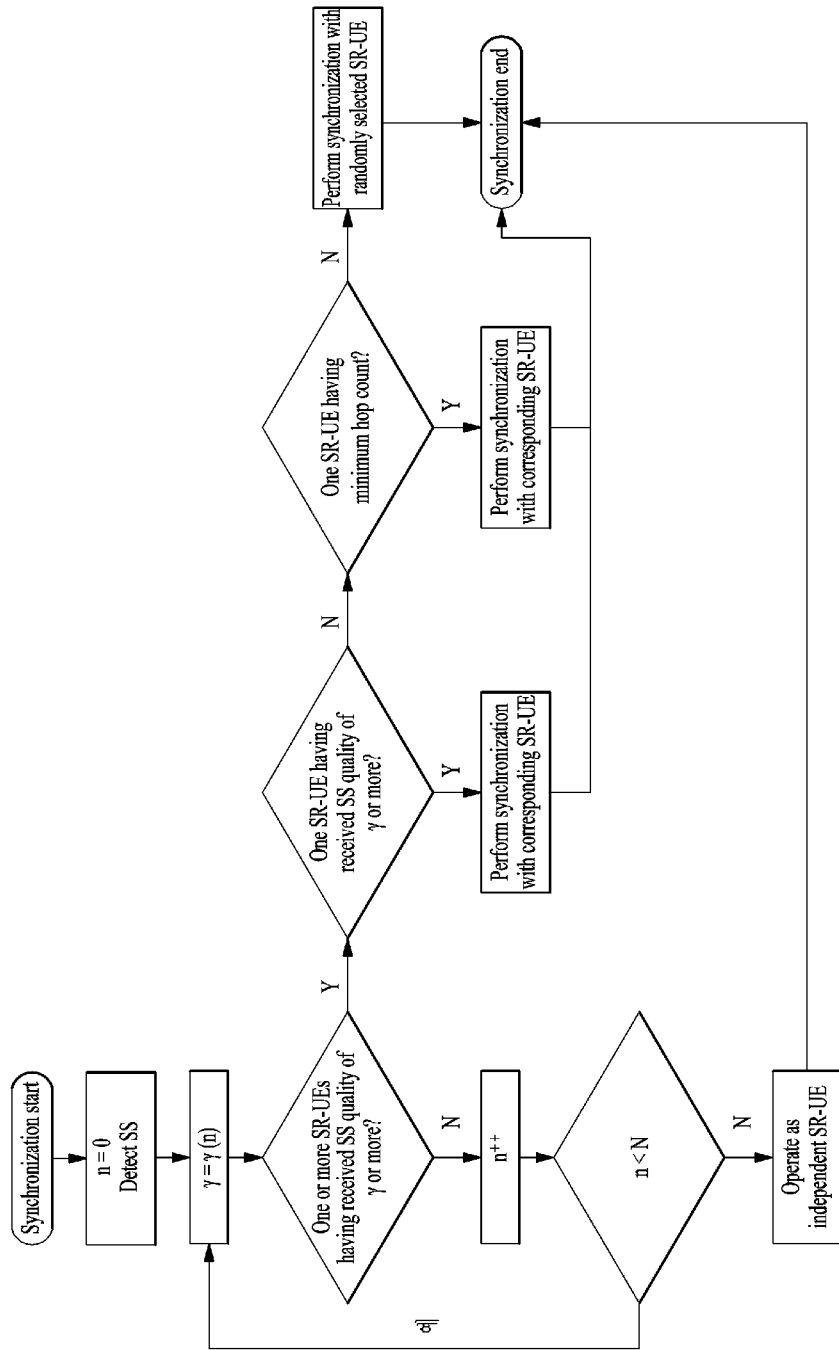
FIG. 27 is a flowchart illustrating an SR-UE selection scheme when a level value of a signal quality is applied.

FIG. 27 is a flowchart illustrating an SR-UE selection scheme when a level value (i.e., N) of the above-described signal quality is applied. As described in SR-UE selection scheme 1, if two or more SR-UEs satisfying a specific quality criterion of a received signal are present, an SR-UE having the lowest hop count may be selected and, if two or more SR-UEs have the lowest hop count, one of these SR-UEs may be randomly selected.

If no SR-UEs satisfy the reception signal quality of the lowest level in FIG. 27, synchronization is performed with respect to an SR-UE having the best reception signal quality among the SR-UEs as in the above-described SR-UE selection scheme 2.

Figure 28:
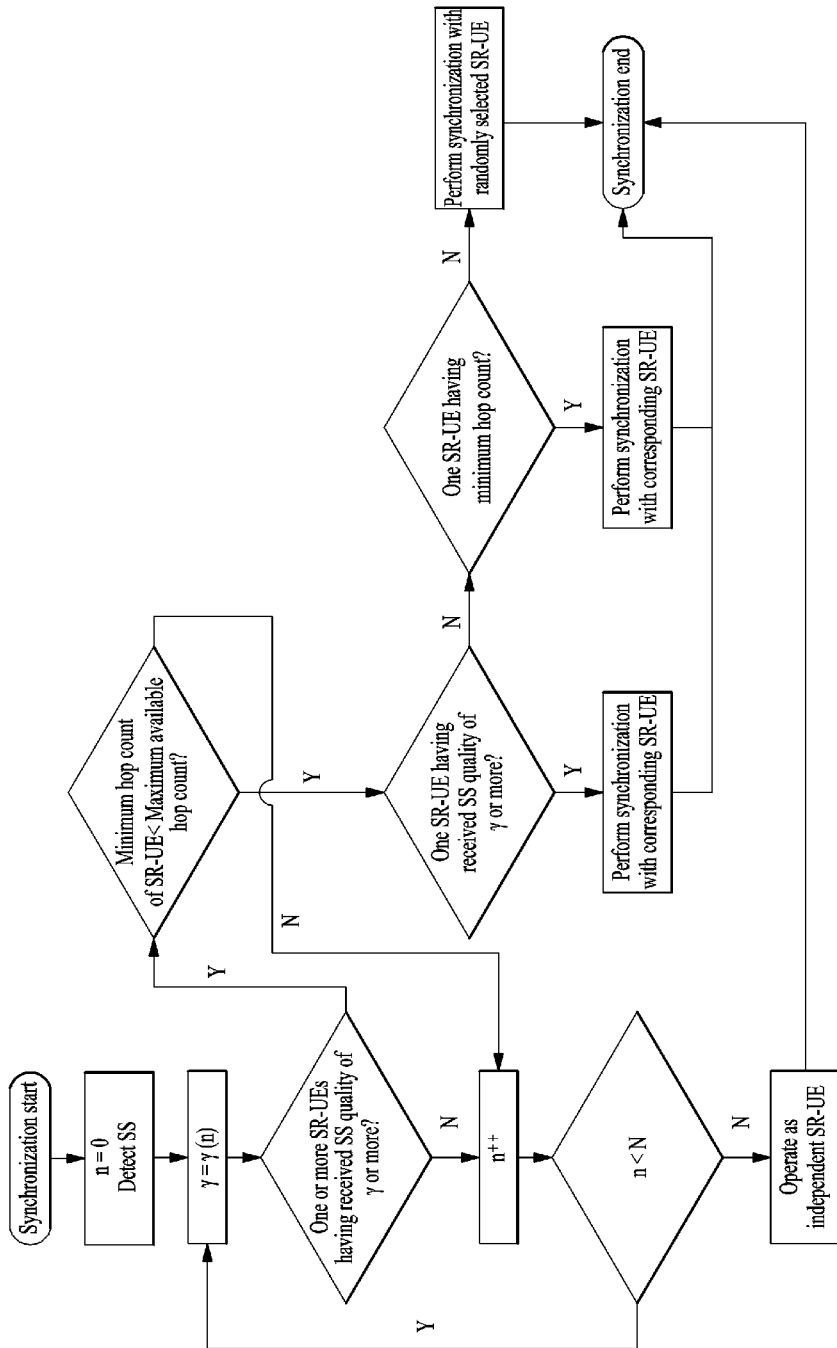
FIG. 28 is a flowchart illustrating a scheme in which a UE operates as an SR-relay UE or an SR-UE.

FIG. 28 is a flowchart illustrating a scheme in which a UE operates as an SR-relay UE or an SR-UE. For a UE to operate as an SR-relay UE or an SR-UE, when a maximum hop count is restricted, it is necessary to determine whether a maximum hop count of a UE is exceeded as illustrated in FIG. 28. Especially, the scheme illustrated in FIG. 28 may be used to prevent the UE from being synchronized with an SR-UE having a relatively very large hop count in spite of good quality of a received SS.

Figure 29:
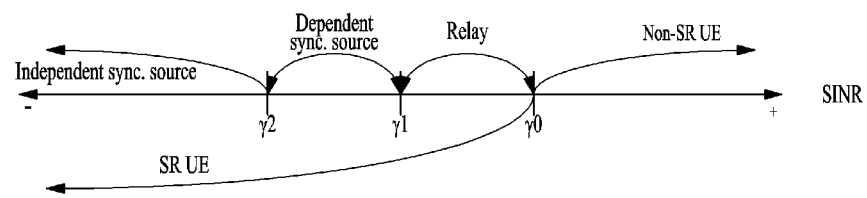
FIG. 29 is a diagram referred to for describing a scheme of applying a differential signal quality criterion according to a synchronization purpose of a UE.

FIG. 29 is a diagram referred to for describing a scheme of applying a differential signal quality criterion according to a synchronization purpose of a UE. As illustrated in FIG. 29, SINR reference values of multiple levels (i.e., $\gamma(0)$, $\gamma(1)$, and $\gamma(2)$) are set and each UE may i) determine a synchronization purpose thereof according to SR-UE selection scheme 2 described above in relation to FIG. 27 or ii), conversely, apply different reference values according to synchronization purpose thereof. For example, the UE may operate as an independent synchronization source upon detecting no SR-UEs having a reception signal quality of $\gamma(0)$ or more and operate as an SR-relay UE upon detecting an SR-UE having a reception signal quality of $\gamma(1)$ or more. Conversely, if a specific UE is determined or configured to be a non-SR UE (i.e., a UE that cannot operate a synchronization source although the UE is synchronized with an SR-relay UE or an SR-UE), an SR-UE to be synchronized is selected based on the reception signal quality of $\gamma(0)$ and a UE determined or configured to operate as an SR-UE selects an SR-UE to be synchronized based on the reception signal quality of γ(1).

SR-UE selection scheme #4: This scheme causes a UE that has received distinguishable D2DSSs/PD2DSCHs from one or more SR-UEs to select an SR-UE to be synchronized. A reception signal quality reference value may be secondarily applied to SR-UE sets divided based on a hop count and multiple quality levels may be applied even to a hop count as described in SR-UE selection scheme 2. In SR-UE selection scheme 4, an SR-UE different from an SR-UE selected in SR-UE selection schemes 1 to 3 may be selected according to a reference value of a hop count. For example, when an SINR of SR-UE #2 of hop count 2 is higher than an SINR of SR-UE #0 of hop count 1 and the both SR-UE #2 and SR-UE #0 satisfy an SINR reference value, if a reference hop count is set to 2, SR-UE #2 is selected when SR-UE selection scheme 4 is applied, whereas SR-UE #1 is selected when SR-UE selection schemes 1 to 3 are applied. Obviously, if the reference hop count is set to 1, the same SR-UE may be selected in SR-UE selection schemes 1 to 3 and in SR-UE selection scheme 4.

Furthermore, after SR-UE selection scheme 4 is applied to a maximum available hop count, at least one of SR-UE selection schemes 1 to 3 may be applied. In this case, SR-UEs not exceeding the maximum hop count are selected first and an SR-UE is selected by comparing reception signal quality of the respective SR-UEs.

SR-UE (Re)Selection and Relay Capability Indication

A description is now given of the case in which all SR-UEs detected by a UE have a maximum available hop count in indicating SR-UE (re)selection and relay capability.

In relation to SR-UE selection, SR-UE selection schemes 1 to 4 may be applied to SR-UEs having a maximum hop count. In this case, synchronization with an SR-UE means that a UE can operate as a non-SR UE or a dependent SR-UE and cannot operate as an SR-relay UE.

When there are no SR-UEs having reception signal quality of a specific level or more, a UE operation may be differently defined according to which of SR-UE selection schemes 1 to 4 is applied. For example, when SR-UE selection scheme 2 is used, a UE may be synchronized with an SR-UE having the best signal quality among SR-UEs so that the UE operates as a non-SR-UE or a dependent SR-UE. When SR-UE selection scheme 1 is used, the UE may operate as an independent SR-UE so that the UE selects and uses a resource independently of other SR-UEs. If SR-UE selection scheme 3 is used, the UE may be synchronized with an SR-UE having the best signal quality among SR-UEs having signal quality within a predetermined range (i.e., below a first level and above a second level, where first level>second level) to operate as a non-SR-UE or a dependent SR-UE and the UE operates as an independent SR-UE when the SR-UEs have signal quality less than a predetermined range (i.e., below the second level).

Meanwhile, UEs (including a non-SR-UE, an SR-relay UE, and a dependent SR-UE) synchronized with a specific SR-UE may perform a reselection procedure. The reselection procedure in the present invention indicates that an SR-UE selection procedure using SR selection scheme 1 to SR-UE selection scheme 4 described above is performed again.

A method for performing the reselection procedure in every valid time period of an SR-UE will now be described first. As described earlier, an operation as an SR-UE in an SR-UE election procedure may be valid only during a finite specific time period and valid time information may be included in a transmitted D2DSS, PD2DSCH, etc. Therefore, upon receiving the information, UEs simultaneously re-performs a synchronization selection procedure when a valid time ends so that the UEs are synchronized with another SR-UE or are elected as an SR-UE. To detect an SR-UE that does not belong to an existing cluster, a scanning time period should be further present after the valid time expires. Upon detecting an SR-UE during the scanning time period, the UEs may be synchronized with the SR-UE. In contrast, when no SR-UE is detected in the scanning time period, the UEs may perform a random backoff procedure so that the UEs become the SR-UE or are synchronized with a newly elected SR-UE (that may be same as an SR-UE of an existing cluster) among members of the existing cluster. An additional time period may be periodically defined so as to perform SR-UE reselection separately from the valid time period.

In addition, a UE may detect a prioritized SR-UE or sense variation of an SR-UE with which the UE is synchronized i) at a timing at which SR transmission of an SR-UE thereof and an adjacent SR-UE is expected or ii) at an arbitrary timing while the UE operates in a reception mode. In this case, the UE may perform a reselection procedure and the UE may be immediately synchronized with a reselected SR-UE or may be synchronized with the reselected SR-UE at a (periodically) predetermined timing. In this case, the UE may be synchronized with a new SR-UE even when a valid time period of a currently synchronized SR is not ended.

The valid time information transmitted by an SR-UE corresponds to information about lifetime as a synchronization source of the SR-UE and may occupy many bits because the information is about time. Meanwhile, since the synchronized UE only needs to acquire information about when the valid period expires, accurate time information is needed only during a partial time duration immediately prior to expiry of the valid time and, during the other time durations, only an index indicating that an expiry time is sufficient may be transmitted to the synchronized UE. For example, if the valid time period information can be represented as 0 to N, N indicates that the time period is not ended prior to N periods rather than indicating that the time period is ended after N periods (or absolute time N). 0 may be used instead of N. Therefore, the SR-UE may transmit N (or 0) for a while based on an accurate valid time known thereto and, if an actual valid time is shorter than N (or 0), the SR-UE may transmit a value such as N−1, N−2, . . . .

Upon selecting an SR-UE, a UE may also consider the valid time information. That is, the UE may pre-exclude an SR-UE having a valid time less than a specific value K from the SR-UE selection procedure or, when two or more SR-UEs having the same hop count and the same reception signal quality are detected in the SR-UE selection procedure, the valid time information may be used as a criterion for selecting one of the SR-UEs.

Meanwhile, in selecting the SR-UE, it may be important whether the SR-UE can support a relay function and a UE that desires to access a network will try to be synchronized with the SR-UE supporting the relay function. Accordingly, the SR-UE may include an index indicating whether the SR-UE has relay capability in a transmitted D2DSS, PD2DSCH, etc. For example, a relay capability field may be set indicating '1' for a relay capable function and '0' for a relay incapable function. Therefore, the UE that desires to access the network selects SR-UEs supporting relay from among detected SR-UEs and then selects an SR-UE with which the UE is to be synchronized by applying one of the above-described SR-UE selection schemes (i.e., SR-UE selection schemes 1 to 4).

Figure 30:
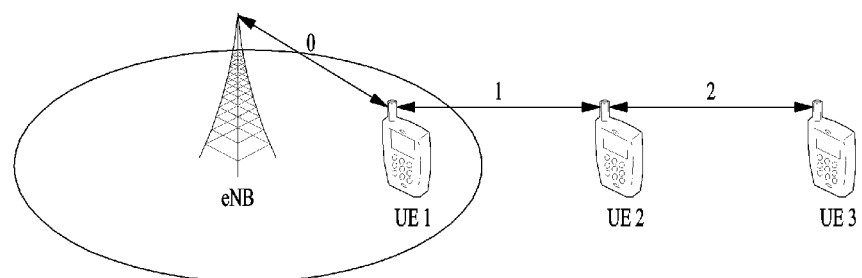
FIG. 30 is a diagram referred to for describing the case in which a D2DSS/PD2DSCH is sequentially relayed when a maximum hop count is set.

FIG. 30 is a diagram referred to for describing the case in which a D2DSS/PD2DSCH is sequentially relayed when a maximum hop count is set. As illustrated in FIG. 30, when a maximum available hop count is N, a D2DSS/PD2DSCH may be sequentially relayed from UE 1 within a network to adjacent UE 2, UE 3, . . . . Assuming that transmission of UE 1 corresponds to hop count 1, whether an SR-UE supports relay may be determined by judging whether the SR-UE is capable of transmitting D2D data to the network or receiving the data from the network.

When a UE having a hop count n (where N≥n>1) sets relay capability to '1' (i.e., relay capable), a UE receiving a signal including this relay capability indication may interpret capability of the UE as follows.

Relay determination 1) UE n supports data relay to a network. That is, UE n is capable of supporting 'UE-UE data relay' and UE k also support 'UE-UE data relay' for all k (where 1<K<n). UE 1 also supports relay.

Relay determination 2) UE n does not support data relay to a network. However, UE 1 supports relay.

When a UE having a hop count n (where N≥n>1) sets relay capability '0', a UE receiving a signal including this relay capability indication may interpret capability of the UE as follows.

Relay determination 3) UE n does not support data relay to a network. In addition, UE 1 does not support relay.

Meanwhile, when a UE having hop count n (where N≥n>1) corresponds to relay determination 2) (i.e., UE n does not support relay), the UE may set relay capability to '0'. In this case, an operation of UE n, (where N≥n>1) is as follows.

UE n selects an SR-UE having the best signal quality among received D2DSSs/PD2DSCHs of an SR-UE using at least one of SR-UE selection schemes 1 to 4 described above and adds 1 to a hop count of the selected D2DSS/PD2DSCH to set the added hop count as a hop count thereof. If a relay capability field of the selected D2DSS/PD2DSCH is set to '0', the UE should also set a relay capability field thereof to '0'. If the relay capability field of the selected D2DSS/PD2DSCH is set to '1', UE n sets the relay capability field to '1' when UE n supports 'UE-UE data relay' and to '0' when UE n does not support 'UE-UE data relay'.

Upon selecting the best SR-UE, a UE may also consider a value of the relay capability field. For example, highest priority may be assigned to an SR-UE supporting relay to select only the SR-UE supporting relay regardless of a hop count or reception signal quality and then consider a minimum hop count, maximum reception signal quality, etc. If priority is assigned by different schemes to selection reference elements such as a hop count, signal quality, relay support/relay non-support, and valid time information, various SR-UE selection schemes may be derived similarly to SR-UE selection schemes 1 to 4.

Particularly, different priorities may be applied according to a D2D use environment. For example, in a normal situation, the highest priority is assigned to a hop count to select an SR-UE and, only when connection to an adjacent network is urgent in an emergency situation, the highest priority is assigned to relay support/relay non-support to configure D2D communication synchronized with an adjacent network up to a maximum hop.

Figure 31:
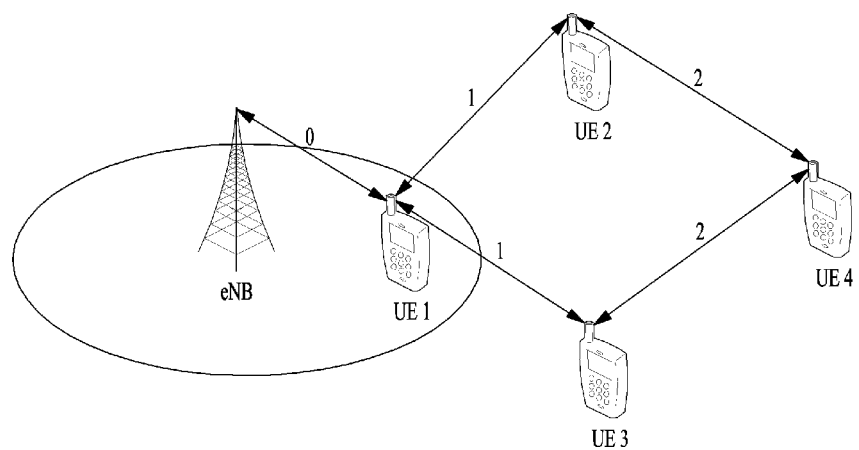
FIG. 31 is a diagram referred to for describing the case in which a PD2DSCH becomes a single frequency network (SFN).

FIG. 31 is a diagram referred to for describing the case in which a PD2DSCH becomes a single frequency network (SFN). As illustrated in FIG. 31, when a PD2DSCH becomes an SFN, there are UEs supporting relay and UEs not supporting relay. That is, a plurality of UEs having hop count n may be present and the respective UEs may have different relay support functions. For example, in FIG. 31, although UE 2 and UE 3 have the same hop count of 1, UE 2 may support relay and UE 3 may not support relay. Accordingly, in this case, since a UE is unaware of capability of different UEs having the same hop, the relay capability field may be set to '0' irrespective of an SR-UE selected thereby. Alternatively, the relay capability field may be set to '1' and this case may be interpreted as the case of relay determination 2) described above. That is, although information as to whether data relay to a network is supported cannot be transmitted, since information indicating that a UE having a hop count of 1 is located within the network is identically applied to all UEs synchronized with UE 1, the relay capability field may be used to transmit such information. If a UE that has received a D2DSS/PD2DSCH having a hop count of n (where N≥n>1) receives the relay capability field of 1, this should be interpreted as indicating that a UE having a hop count of 1 is located in the network.

Meanwhile, since an indicator indicating whether to support relay is related to UE capability, the indicator may be designed to be transmitted in the form of a signal such as a discovery signal rather than to be included in the D2DSS/PD2DSCH. In this case, a UE that desires to access the network through a D2D link, i.e., a UE that expects data relay, is synchronized with a D2DSS/PD2DSCH selected using SR-UE selection schemes 1 to 4 and performs a procedure of discovering a UE supporting a data relay function among UEs transmitting the D2DSS/PD2DSCH. If no UEs supporting the data relay function are discovered, the UE performs a D2DSS/PD2DSCH selection procedure again using SR-UE selection schemes 1 to 4.

In the D2DSS/PD2DSCH reselection procedure, a previous D2DSS/PD2DSCH that fails to discover an SR-relay UE should be excluded. Accordingly, a UE expecting data relay may pre-exclude a D2DSS/PD2DSCH that fails to discover an SR-relay UE, maximally set a hop count of the D2DSS/PD2DSCH that fails to discover the SR-relay UE, or minimally set received signal quality, upon performing a synchronization reselection procedure, so that, the UE may set the corresponding D2DSS/PD2DSCH to have the lowest priority upon applying the SR-UE selection scheme.

Regardless of which SR-UE selection scheme is used, the reselection procedure is useful to discern related information in a synchronization procedure because the synchronization procedure should be sequentially repeated according to a criterion of a corresponding SR-UE selection scheme when a UE fails to discover an SR-relay UE in a selected D2DSS/PD2DSCH.

Accordingly, in order to indicate information representing that there is a UE supporting data relay among UEs transmitting the D2DSS/PD2DSCH, the relay capability field may be defined in the D2DSS/PD2DSCH. For example, an eNB may command one or more UEs located within a network to transmit the D2DSS/PD2DSCH by an SFN scheme, wherein the eNB may command a specific UE set including a UE supporting data relay to transmit the D2DSS/PD2DSCH and set the relay capability field to 1.

Figure 32:
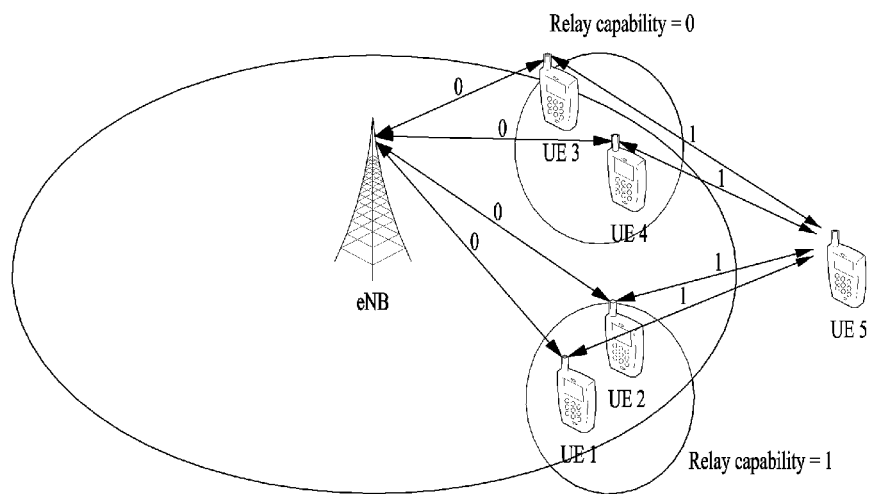
FIG. 32 is a diagram referred to for describing the case in which UEs supporting relay and UEs not supporting relay are mixed.

FIG. 32 is a diagram referred to for describing the case in which UEs supporting relay and UEs not supporting relay are mixed. In FIG. 32, it is assumed that UE 2 supports relay and UE 1, UE 3, and UE 4 do not support relay. In this case, the eNB may command UEs to differently set a relay capability field upon commanding UE 1 and UE 2 to transmit D2DSSs/PD2DSCHs and commanding UE 3 and UE 4 to transmit D2DSSs/PD2DSCHs. When the eNB commands UE 1 and UE 2 (or UE 3 and UE 4) to transmit D2DSSs/PD2DSCHs, UE 5 that desires relay connection may be synchronized with D2DSSs/PD2DSCHs transmitted from UE 1 and UE 2 (or UE 3 and UE 4) with priority over other D2DSSs/PD2DSCHs.

Then, when a UE receives D2DSSs/PD2DSCHs, the UE may recognize that there is a UE supporting data relay among UEs that transmit the D2DSSs/PD2DSCHs, if the corresponding signals are transmitted by UE(s) within a network, a hop count value is 1, and a relay capability field is set to '1'. A UE that desires data relay is first synchronized with a D2DSS/PD2DSCH having the relay capability field set to 1. The UE may then discover a UE supporting relay through an additional procedure, configure a D2D link with respect to a corresponding UE to connect to the D2D link, and transmit data using a resource linked to the D2DSS/PD2DSCH by a broadcasting scheme according to traffic attributes.

Relay Triggering

Figure 33:
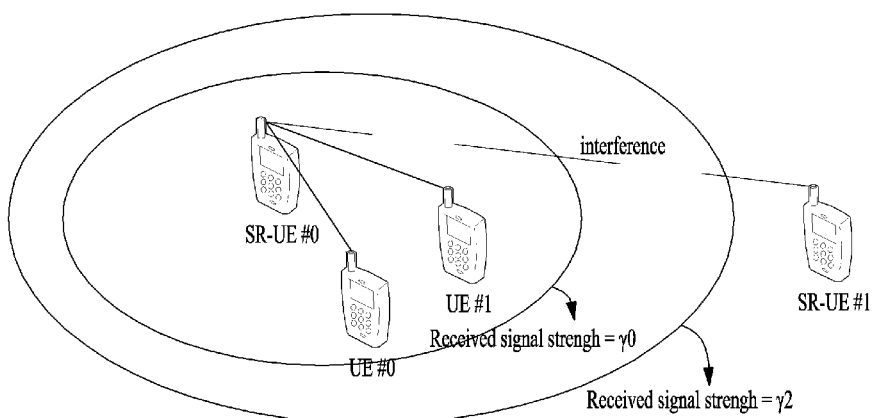
FIG. 33 is a diagram referred to for describing relay triggering when no SR-relay UEs are present.

FIG. 33 is a diagram referred to for describing relay triggering when no SR-relay UEs are present. As described above, a UE may operate as an SR-relay UE when the strength of a D2DSS received from an SR-UE is within a predetermined range. That is, in order for the UE to operate as the SR-relay UE, the UE should decode corresponding information by being synchronized with a D2DSS of the SR-UE. Therefore, while a signal received from the SR-UE is higher than a specific level, the UE may be defined as operating as a non-SR-UE when the received signal strength is too high.

However, a situation in which no SR-relay UE is present may occur as illustrated in FIG. 33. In this case, if an adjacent SR-UE starts to perform D2D transmission in an unsynchronized state, unexpected interference may occur. Accordingly, even when strength of a signal received from an SR-UE is excessively high and a UE does not satisfy a threshold value for operating as an SR-relay UE, if the eNB or the SR-UE commands the UE to operate as the SR-relay UE, the UE may be synchronized with the eNB or the SR-UE so as to operate as the SR-relay UE. An (unsynchronized) SR-UE that has received a D2DSS from the SR-relay UE is synchronized with a relayed D2DSS.

Mobility Support and Hop Count for D2DSS Reselection

If an attribute of a D2DSS with which a UE is synchronized is changed or a D2DSS having a higher priority than the D2DSS with which the UE is synchronized is detected, the UE may reselect the D2DSS. That is, as described above, an operation scheme of the UE may be differently defined according to various elements such as signal strength of a received D2DSS, a hop count, and an indicator indicating whether to support relay. For example, if the UE operates to be synchronized with a corresponding D2DSS only when the quality of the received D2DSS is above a specific level, the UE may determine that the attribute of the D2DSS is changed when the strength of the received D2DSS (a PSS/SSS in the case of being synchronized with an eNB) is continuously attenuated to a value less than a threshold value and may perform a reselection procedure.

Figure 34:
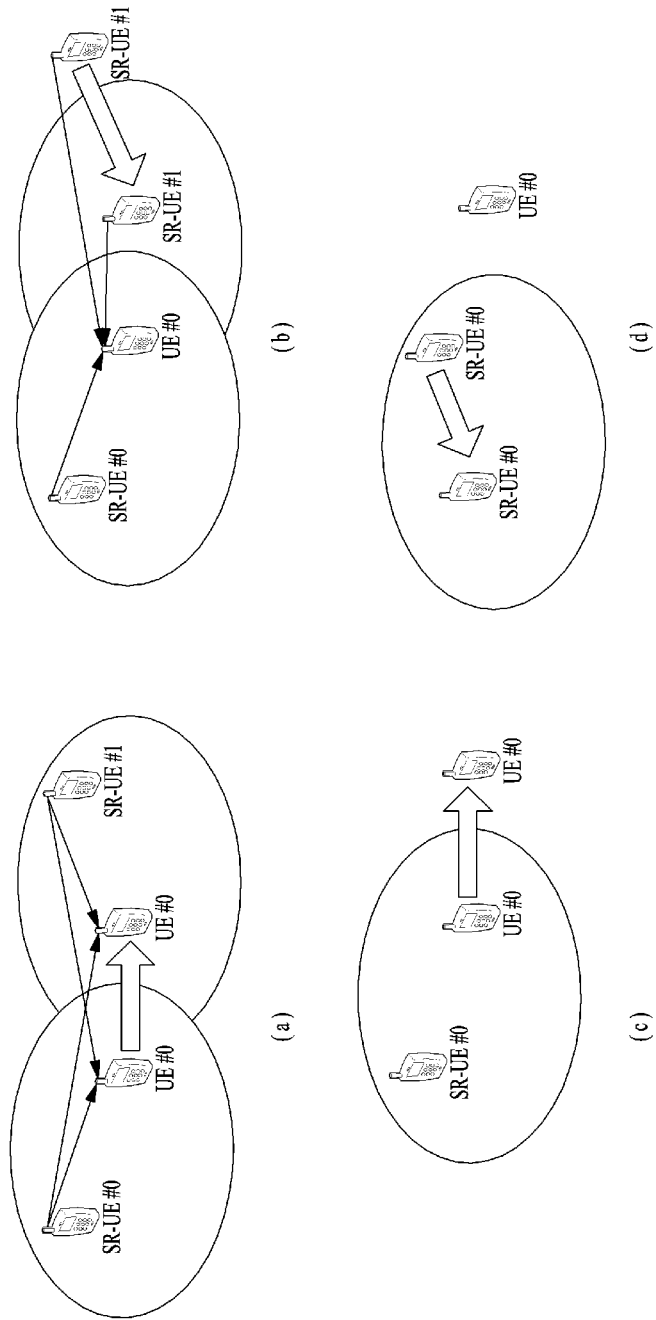
FIG. 34 illustrates the case in which an attribute of a D2DSS with which a UE is synchronized is changed due to mobility of the UE and a D2DSS having a higher priority than a D2DSS with which the UE is synchronized is detected.

FIG. 34 illustrates the case in which an attribute of a D2DSS with which a UE is synchronized is changed due to mobility of the UE and a D2DSS having a higher priority than a D2DSS with which the UE is synchronized is detected. FIG. 34(A) and FIG. 34(C) illustrate the case in which an attribute of a D2DSS is changed due to mobility of a UE and FIG. 34(B) and FIG. 34(D) illustrate the case in which an attribute of a D2DSS is changed due to mobility of an SR-UE. However, the UE regards FIGS. 34(A) to 34(D) as the same situation.

In the situation of FIG. 34, a reselection procedure of a UE will now be described.

First, when an attribute of a D2DSS is changed, the UE may attempt to scan an adjacent D2DSS immediately or at a determined timing. The UE may attempt to scan the D2DSS using information of a D2DSS detected at a previous scan timing or perform reselection using information of the D2DSS detected at the previous scan timing by omitting a scan trial procedure and then sequentially attempt to detect a selected D2DSS.

The case in which no D2DSS having priority is detected corresponds to the case in which there is no D2DSS to replace a current D2DSS, for example, the strength of a detected D2DSS is lower than a threshold value, a hop count is a maximum value, or a UE is located in an isolated region. Accordingly, the UE may operate as an SR-UE by directly transmitting a D2DSS or maintain a current D2DSS according to whether attribute change thereof is a level capable of changing an operation mode. For example, if attribute change corresponds to increase of the hop count, the UE operates as the SR-UE when the hop count is a maximum value and maintains a current D2DSS when the hop count is not the maximum value.

However, when a D2DSS with priority is detected, the UE may be synchronized with a new D2DSS using one of the above-described reselection schemes.

In contrast, when attribute change of a D2DSS does not occur, the UE may scan an adjacent D2DSS at a specific predetermined periodic/aperiodic time/period designated by an eNB/SR-UE/scheduling UE and arbitrarily selected thereby. In this case, there is no detected D2DSS having priority, the UE maintains a current D2DSS and, when there is a detected D2DSS having priority, the UE may be synchronized to a new D2DSS using one of the above-described reselection schemes of the present invention.

In the above-described reselection procedure of a UE, when the UE performs reselection in the case in which a newly detected D2DSS having priority is present, a criterion and/or a threshold value of a D2DSS having priority different from an initially selected D2DSS may be applied because excessively frequent reselection procedures may cause instability of a network. To this end, it is desirable to assign priority (i.e., advantage) to a currently synchronized D2DSS. For example, when priority is determined according to the signal quality of a received D2DSS, fair comparison is performed with respect to all detected D2DSSs during first selection, whereas, during reselection, a specific offset is additionally set with respect to the signal quality of a currently synchronized D2DSS to perform reselection only with respect to a D2DSS having better signal quality than the quality of a corresponding D2DSS by the offset or more. Similarly, even for a hop count, the offset may be set with respect to a current D2DSS during reselection.

Alternatively, the offset may be applied when determination as to whether there is attribute change is made. That is, if no change exceeding the offset is sensed in a D2DSS of a UE, the UE may not perform the reselection procedure. If such a scheme is used, the case in which a D2DSS having priority is detected when attribute change of the D2DSS does not occur is present will not occur.

Especially, when multi-hop relay can be performed, a different offset value per hop may be applied during reselection. Because a D2DSS reselection procedure of a high hop cause much change in terms of a network, it is effective to maintain a current state to stabilize the network.

Accordingly, a UE of a low hop may determine that an attribute of a D2DSS has been changed when a UE of a high hop is synchronized with a new D2DSS (when an SFN is used, the same may not be applied) and perform a D2DSS scan procedure. The UE of the high hop may reselect a D2DSS and transmit information about a D2DSS to be pre-changed to the UE of the lower hop before resynchronization, thereby aiding in a scan procedure of the lower hop.

FIG. 35 is a diagram referred to for describing reselection of a D2DSS in consideration of a hop count. FIG. 35(A) illustrates the case in which a UE having a hop count of 1 reselects a D2DSS and FIG. 35(B) illustrates the case in which a UE having a hop count of 3 (a maximum hop count) reselects a D2DSS.

As illustrated in FIG. 35, while D2DSS reselection by a UE having a high hop causes subsequent D2DSS reselection, D2DSS of a final hop does not cause change of a network having a high hop. Therefore, according to the present invention, a different offset value for each hop may be defined as shown in Table 5. If such a scheme is used, the UE having a high hop count may limitedly perform reselection due to a high reselection offset, whereas a UE having the lowest hop count (or a maximum hop count) may freely perform reselection due to a low offset. In addition, an offset may be set to '0' with respect to the UE having the lowest hop count (or maximum hop count) UE so as to exclude difference from first D2DSS selection only with respect to the UE having the lowest hop count. If a UE can be aware of presence of a UE synchronized therewith, Q(N) may be applied only to the case in which a lower hop of the UE is not present.

TABLE 5

| Hop Count | Offset |
|---|---|
| 1 | Q(1) |
| 2 | Q(2) (<Q(1)) |
| ... | ... |
| N (Maximum hop) | Q(N) (<Q(N-1)) |

D2DSS Transmission Resource Pattern

In the present invention, a transmission resource region of a D2DSS is not always divided by a relay hop count as illustrated in FIG. 21. That is, two or more D2DSS transmission resources may be present within a predetermined D2DSS transmission period and information about such a transmission resource period may be defined to be transmitted in a control channel such as a PD2DSCH or transmitted according to a predetermined pattern.

In more detail, a D2DSS may include a transmission-capable resource region of N times (where P≥N≥1) during a D2DSS transmission period P and each transmission-capable timing may have an interval of a K(i) (where 1≤i≤N) duration. The UE may select a specific resource region from among transmission-capable resource regions of N times to transmit the D2DSS.

Figure 36:
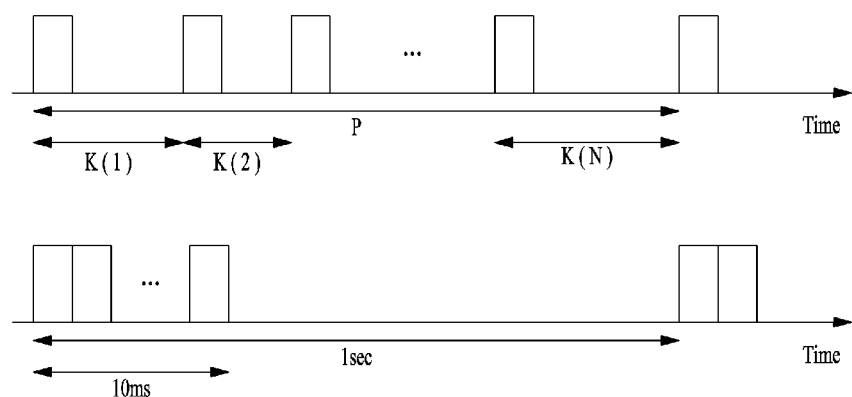
FIG. 36 illustrates the case in which a specific resource region is repeatedly present in a D2DSS transmission period.

FIG. 36 illustrates the case in which P=1000, N=10, and K(i)=1 for all I, in a time unit (subframe) of 1 ms.

Although a specific resource region for D2DSS transmission may be configured to have all resource regions or a partial resource region arbitrarily selected from among all of the resource regions, i) a resource region linked to a hop count may be used or ii) a resource region having the lowest signal strength of a received D2DSS may be used.

Meanwhile, one or plural consecutive transmission resources may be configured to be allocated at a specific interval rather than a plurality of D2DSS transmission resources being consecutively allocated. According to this scheme, an influence of WAN communication caused by D2DSS transmission can be reduced and reduction of a D2DSS transmission opportunity can be compensated when consecutive subframes cannot be configured as UL as in a TDD system.

Figure 37:
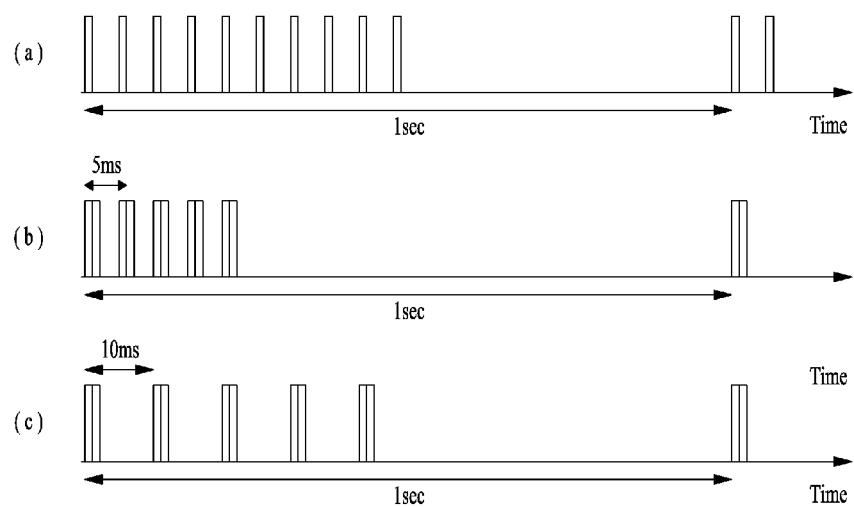
FIGS. 37 to 39 are diagrams illustrating the case in which transmission resources are allocated at a specific interval according to the present invention.

FIG. 37 is a diagram illustrating the case in which transmission resources are allocated at a specific interval according to the present invention.

Referring to FIG. 37, when an index of a transmission resource for P=1 s (i.e., 1000 ms) and N=10 is i, K(i)=5 for all i as illustrated in FIG. 37(a), K(i)=1 for odd indexes (i=1,3,5, . . . ) as illustrated in FIG. 37(b), or K(i)=4 for even indexes (i=2,4,8 . . . ) so that a pattern configured at an interval of 5 ms may be provided between resources having odd indexes. Alternatively, a transmission pattern (10 ms between odd indexes) defined to be configured as K(i)=1 for odd indexes (i=1,3,5, . . . ) and K(i)=9 for even indexes (i=2,4,8 . . . ) may be provided as illustrated in FIG. 37(c).

Particularly, since the TDD system may have the above-described UL-DL configuration as shown in Table 2, if K(i) is set to 5 ms to 10 ms, N transmission opportunities may be provided within a D2DSS transmission period. For example, if a transmission period is 100 ms and a transmission-capable resource interval is 10 ms, a transmission-capable subframe of a D2DSS may be determined as SF #100*i+ 10*j+2 (where i and j=0,1,2, . . . ) (SF #2, 12, 22, . . . ). In this case, the UE may attempt to transmit the D2DSS in one subframe or in two or more subframes and attempt to detect the D2DSS in the other subframes with respect to a resource region of 10 uniformly distributed subframes within a period of 100 ms (or the UE may attempt to detect the D2DSS in all subframes or the UE may attempt to detect the D2DSS in specific some subframes and attempt to transmit the D2DSS in some subframes). In this case, information about a D2DSS transmission subframe may be transmitted to a UE in coverage of an eNB (an in-coverage UE) through a signal of an eNB physical layer and a signal of a higher layer such as an RRC signal or may be defined to use a prescheduled pattern. In addition, the information may be transmitted to a UE out of a coverage area (an out-coverage UE) through a D2D control channel, such as a PD2DSCH, and a D2D data channel Particularly, in selecting a subframe in which the UE attempts to perform transmission, the UE may be synchronized with a D2DSS of a high hop count to select a subframe corresponding to a hop count thereof and then to transmit the D2DSS. However, the UE may be synchronized with a D2DSS having the best reception strength of a D2DSS discovery signal to select an arbitrary subframe or select a subframe in which the reception strength of the D2DSS discovery signal is lowest (i.e., a subframe in which other D2DSSs are not detected). This scheme may be identically applied even to an FDD system and, in this case, a D2DSS may be configured to be present at a period of 4 ms or 8 ms. In addition, the transmission pattern is not always defined to have an interval of 5 ms/10 ms or 4 ms/8 ms and may have an arbitrary transmission interval. The transmission pattern may be reconfigured to have another transmission interval value over time or a specific transmission resource or all transmission resources may be released.

As illustrated in FIG. 36, a D2DSS transmission resource region may include N D2DSS transmission resources within a predefined or signaled D2DSS transmission period (hereinafter, "P") (where P≥N≥1). Each of the N D2DSS transmission resources may include an interval of K(i) (where 1≤i≤N). In this case, D2D UE #X may i) attempt to transmit a D2DSS in one resource (e.g., subframe) or in two or more resources and attempt to detect the D2DSS in the other resources, ii) attempt to detect the D2DSS in all resources, or iii) attempt to detect the D2DSS in specific partial resources and attempt to transmit the D2DSS in some resources, among N D2DSS transmission resources within the D2DSS transmission period P.

In this case, D2D UE #X may mean an SR-UE (a UE providing an SR signal), an independent synchronization source (ISS) UE, or a UE relaying an SR signal (i.e., an SR-relay UE). For convenience of description, although a description will be given based on a UE that relays an SR signal, it is apparent that the UE can be extended to other forms or other types of UEs.

In addition, a resource that a UE or an SR-UE relaying an SR signal selects to attempt to transmit a D2DSS among N D2DSS transmission resources within a D2DSS transmission period P should be efficiently selected in consideration of a half duplex (HD) problem (i.e., inability to perform a D2DSS reception operation due to a D2DSS transmission operation) or an interference problem.

Figure 38:
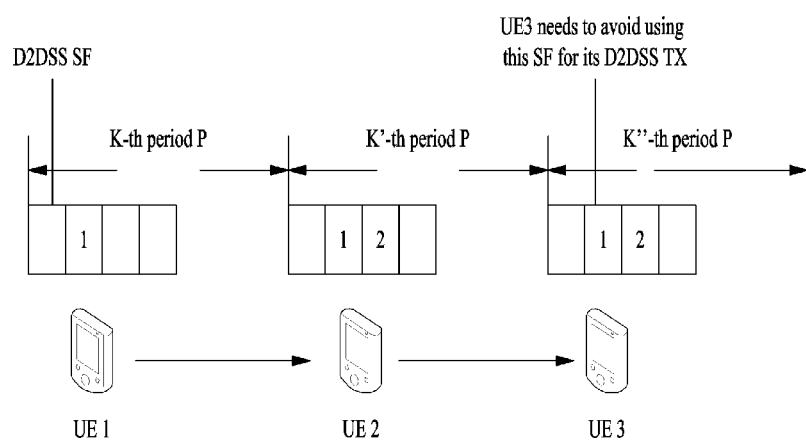

FIG. 38 is a diagram referred to for describing the case in which 3 UEs select D2DSS transmission resources in a D2DSS transmission resource region P, N=4, and K(i)=1 for all i. It is assumed that the UEs are configured to select a resource having the lowest detection energy or a resource having energy lower than a predefined (signaled) threshold value.

Under such an assumption, in FIG. 38, when UE 1 (in this case, an SR-UE) transmits a D2DSS in the second D2DSS subframe of a K-th period P and UE 2 (a UE relaying an SR signal, i.e., an SR-relay UE) that has received the D2DSS transmits a D2DSS using a resource in the third D2DSS subframe of a K'-th period P rather than a resource in the second D2DSS subframe in which a D2DSS of high energy is detected, it is undesirable that UE 3 (a UE relaying an SR signal) transmit the D2DSS using a resource in the second D2DSS subframe of a K"-th period P in which low energy is detected due to a relatively long distance. This is because the D2DSS transmitted through the resource in the second D2DSS subframe of the K"-th period P may generate interference with respect to UEs that receive the D2DSS (i.e., the D2DSS transmitted through the resource in the second D2DSS subframe of the K-th period P) of UE 1 (i.e., SR-UE) and UE 3 is incapable of receiving the D2DSS transmitted by UE 1 (where K, K', and K" may be set to have the same value (i.e., the same period interval) or different values according to predefined configuration).

Accordingly, in order to solve the above problems, a UE (e.g., a UE relaying an SR signal) or an SR-UE that has detected a D2DSS in an N-th D2DSS transmission resource (e.g., subframe) of a K-th D2DSS transmission period P may be configured to transmit or relay the D2DSS according to the following resource selection scheme 1) or resource selection scheme 2). In this case, such configuration may be limitedly applied only to the case in which a D2DSS transmission resource is not selected in linkage with a hop count value.

Figure 39:
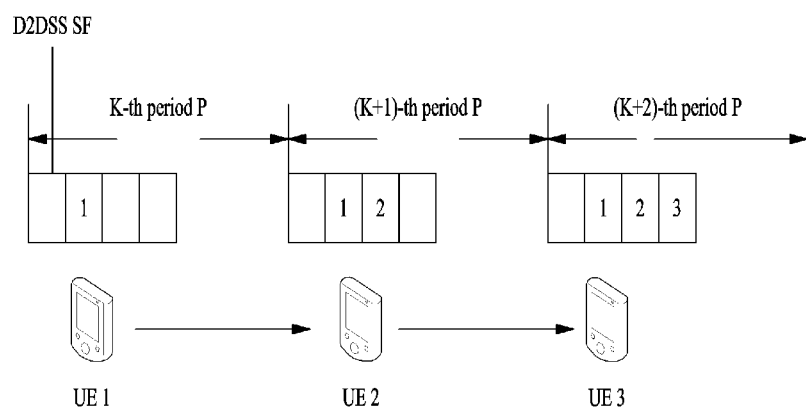

Resource selection scheme 1: A UE that has detected a D2DSS in an N-th D2DSS transmission resource (e.g., subframe) of a K-th D2DSS transmission period P may be configured to transmit (or relay) the D2DSS in an N'-th D2DSS transmission resource of a K'-th D2DSS transmission period. In this case, K' may be defined as (K+P_OFFSET) (e.g., P_OFFSET is an integer greater than or equal to 1 (or 0)) and N' may be defined as ((N+N_OFFSET) mod N) (e.g., N_OFFSET is an integer greater than or equal to 1 (or 0), where operation of (A mod B) denotes a remainder obtained by dividing A by B). FIG. 39 illustrates the case in which all of P_OFFSET and N_OFFSET of resource selection scheme 1 are set to 1 under the same assumption as in FIG. 38.

Resource selection scheme 2: An SR-UE may be configured to select i) an arbitrary D2DSS transmission resource, ii) a resource having lowest detection energy (i.e., Min (power)), or iii) a resource having energy lower than a predefined (signaled) threshold value, since there is no reference resource (e.g., a resource on which a D2DSS is detected) for determining a D2DSS transmission resource based on resource selection scheme 1.

Figure 40:
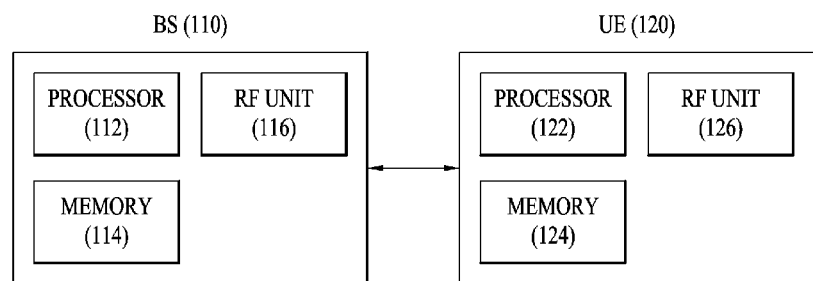
FIG. 40 illustrates a BS and a UE which are applicable to an embodiment of the present invention.

FIG. 40 illustrates a BS and a UE which are applicable to an embodiment of the present invention.

If a wireless communication system includes a relay, communication in a backhaul link is performed between the BS and the relay and communication in an access link is performed between the relay and the UE. Accordingly, the BS and UE shown in the drawing may be replaced with the relay according to situation.

Referring to FIG. 40, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor.

The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the SR signal transmission method for D2D communication in a wireless communication system and the apparatus therefor have been described focusing on examples applied to a 3GPP LTE system, the present invention is applicable to various wireless communication systems in addition to the 3GPP LTE system.

What is claimed is:

1. A method for a first user equipment (UE) to directly communicate with another UE in a wireless communication system, the method comprising:
   detecting, by the first UE, synchronization signals of candidate UEs;
   selecting, by the first UE, a synchronization reference UE (SyncRef UE) among the candidate UEs,
   wherein a reception power of a first synchronization signal of the SyncRef UE exceeds a first threshold value, and
   wherein the first synchronization signal of the SyncRef UE is detected on a first time resource,
   transmitting a second synchronization signal on a second time resource according to offset information,
   wherein the second synchronization signal is same as the first synchronization signal of the SyncRef UE,
   wherein the second time resource is differently configured from the first time resource based on the offset information, and
   wherein the first UE is operating out of a coverage of a base station.

2. The method of claim 1, wherein the reception power of the first synchronization signal of the SyncRef UE is below a second threshold value.

3. The method of claim 1, wherein the first UE and the SyncRef UE are a Device-to-Device (D2D) UE.

4. The method of claim 1, wherein the offset information is included in a preconfigured parameter.

5. A first user equipment (UE) directly communicating with another UE in a wireless communication system, the first UE comprising:
   a processor;
   a memory coupled with the processor and storing information to operate the processor; and
   a transceiver coupled with the processor,
   wherein the processor is configured for:
   detecting synchronization signals of candidate UEs;
   selecting a synchronization reference UE (SyncRef UE) among the candidate UEs,
   wherein a reception power of a first synchronization signal of the SyncRef UE exceeds a first threshold value, and
   wherein the first synchronization signal of the SyncRef UE is detected on a first time resource,
   transmitting a second synchronization signal on a second time resource according to offset information,
   wherein the second synchronization signal is same as the first synchronization signal of the SyncRef UE,
   wherein the second time resource is differently configured from the first time resource based on the offset information, and
   wherein the UE is operating out of a coverage of a base station.

6. The first UE of claim 5, wherein the reception power of the first synchronization signal of the SyncRef UE is below a second threshold value.

7. The first UE of claim 5, wherein the first UE and the SyncRef UE are a Device-to-Device (D2D) UE.

8. The first UE of claim 5, wherein the offset information is included in a preconfigured parameter.

* * * * *